(12) United States Patent
Awtar et al.

(10) Patent No.: US 6,688,183 B2
(45) Date of Patent: Feb. 10, 2004

(54) APPARATUS HAVING MOTION WITH PRE-DETERMINED DEGREES OF FREEDOM

(75) Inventors: Shorya Awtar, Cambridge, MA (US); Alexander H. Slocum, Bow, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/228,874

(22) Filed: Aug. 26, 2002

(65) Prior Publication Data

US 2002/0194926 A1 Dec. 26, 2002

Related U.S. Application Data

(63) Continuation-in-part of application No. 10/052,726, filed on Jan. 18, 2002.
(60) Provisional application No. 60/292,966, filed on Jan. 19, 2001.

(51) Int. Cl.[7] .............................. G01L 1/00; G05G 1/04
(52) U.S. Cl. ........................................... 73/782; 74/521
(58) Field of Search ......................... 74/521; 248/370; 73/782

(56) References Cited

U.S. PATENT DOCUMENTS

| | | | | |
|---|---|---|---|---|
| 3,419,238 A | * | 12/1968 | Flory .................... 248/163.1 |
| 3,681,979 A | | 8/1972 | Hammond, Jr. |
| 4,118,975 A | | 10/1978 | Iwasaki |
| 4,132,318 A | * | 1/1979 | Wang et al. ............... 414/591 |
| 4,160,325 A | | 7/1979 | DeNicola |
| 4,615,591 A | * | 10/1986 | Smith et al. ................ 359/391 |
| 4,667,415 A | * | 5/1987 | Barsky ...................... 33/568 |
| 4,691,559 A | | 9/1987 | Fischer |
| 4,694,477 A | * | 9/1987 | Siddall ....................... 378/34 |
| 4,699,000 A | | 10/1987 | Lashmore et al. |
| 4,819,491 A | | 4/1989 | McMurtry |
| 5,028,180 A | * | 7/1991 | Sheldon et al. ............. 409/201 |
| 5,067,346 A | | 11/1991 | Field |
| 5,281,884 A | * | 1/1994 | Basavanhally et al. ..... 310/328 |
| 5,301,566 A | * | 4/1994 | Tahmasebi et al. ....... 74/490.01 |
| 5,484,219 A | * | 1/1996 | Drew et al. ................... 403/57 |
| 5,485,763 A | * | 1/1996 | Pincus ........................ 74/521 |
| 5,546,797 A | | 8/1996 | Dutta et al. |
| 5,656,905 A | * | 8/1997 | Tsai ...................... 318/568.21 |
| 5,832,783 A | * | 11/1998 | Sheldon .................... 74/490.03 |
| 5,901,936 A | * | 5/1999 | Bieg .......................... 248/370 |
| 5,987,726 A | * | 11/1999 | Akeel ...................... 29/407.08 |
| 6,047,610 A | * | 4/2000 | Stocco et al. ............. 74/479.01 |
| 6,100,524 A | | 8/2000 | Yagi et al. |
| 6,193,226 B1 | | 2/2001 | Davies |
| 6,311,135 B1 | | 10/2001 | Suresh et al. |
| 6,402,329 B1 | * | 6/2002 | Bailly et al. ................. 359/872 |
| 6,453,566 B1 | * | 9/2002 | Bottinelli et al. ............ 33/1 M |
| 6,484,602 B1 | * | 11/2002 | Dagalakis et al. ........ 74/490.08 |
| 6,543,740 B2 | * | 4/2003 | Gaunt et al. ................. 248/476 |

* cited by examiner

Primary Examiner—Edward Lefkowitz
Assistant Examiner—Takisha S Miller
(74) Attorney, Agent, or Firm—Daly, Crowley & Mofford, LLP

(57) ABSTRACT

A motion apparatus having two or five degrees of freedom includes a plurality of arm flexures, a plurality of parallelogram flexures or a plurality of compound parallelogram flexures. The motion apparatus minimizes direct, parasitic, and coupled error motions.

37 Claims, 14 Drawing Sheets

APPARATUS HAVING MOTION WITH PRE-DETERMINED DEGREES OF FREEDOM

CROSS REFERENCE TO RELATED APPLICATIONS

This application is a continuation-in-part of application Ser. No. 10/052,726 filed Jan. 18, 2002 which claims the benefit of application Ser. No. 60/292,966 filed Jan. 19, 2001 under 35 U.S.C. §119(e). Each of the aforementioned applications is hereby incorporated herein by reference in its entirety.

STATEMENT REGARDING FEDERALLY SPONSORED RESEARCH

Not Applicable.

FIELD OF THE INVENTION

This invention relates generally to mechanical apparatus and more particularly to mechanical apparatus having pre-determined degrees of freedom and associated constrained degrees of freedom.

BACKGROUND OF THE INVENTION

As is known, motion can be described as having six degrees of freedom. The six degrees of freedom of motion are, in reference to rectangular Cartesian axes, linear motion along the x-axis, the y-axis, and the z-axis, and rotational motion about the x-axis, the y-axis, and the z-axis. Various mechanical apparatus can move in one or more of the six degrees of freedom, while being constrained in others of the six degrees of freedom. Such mechanical apparatus are referred to herein as "constrained apparatus."

A two-axis flexure mechanism is a type of constrained apparatus for which a portion of the apparatus, herein referred to as a "motion stage," moves along a first axis in response to a first force applied along the first axis, and for which the motion stage moves move along a second axis in response to a second force applied along the second axis. The first and the second axes are often perpendicular to each other, but can also be at other relative angles. The first and the second forces are generated with respective first and second actuators, which can be solenoids, linear motors, piezoelectric actuators, lead screws, or the like. The two-axis flexure mechanism provides a motion stage that is essentially unconstrained within limits in two degrees of freedom in a motion plane, and may or may not be constrained in the four other degrees of freedom.

To provide the two-axis flexure mechanism, some conventional designs use a stacked assembly having a first linear motion stage stacked on top of a second linear motion stage. The first and the second linear motion stages can be single degree of freedom flexure mechanisms each providing translation along one respective axis. The stacked assembly is often referred to as a "serial-kinematics" design. In the serial-kinematics design, the first linear stage has a first actuator and the second linear stage has a second actuator. With this arrangement, the first linear stage can move along the first axis and the second linear stage can move along the second axis, each linear stage able to move in translation with one degree of freedom. Here, the entire second stage moves in response to movement of the first stage. The motion stage, capable of moving in the motion plane, is coupled to the second stage. The serial-kinematics design requires that the second stage have an actuator that moves accordingly along with the second stage. Furthermore, the serial-kinematics design having the stacked arrangement requires a substantial height, the height perpendicular to the motion plane. These design factors result in serial-kinematics designs being relatively large and complex.

Another two-axis flexure mechanism uses a "parallel-kinematics" design. The parallel-kinematics design usually provides a smaller mechanism than the serial-kinematics design described above. Like the serial-kinematics design, the parallel-kinematics design has a motion stage that can move in-a motion plane. Here, the first and second stages and actuators associated therewith are not stacked, but instead are disposed in the motion plane. However, the conventional parallel-kinematics design generates errors in the motion of the motion stage along the first axis and the second axis.

Error motions are characterized herein as "direct," "parasitic," and "coupled." Direct error motion will be understood to be motion in a constrained degree of freedom in response to a force in the direction of the constrained degree of freedom. Parasitic error motion will be understood to be motion in a constrained degree of freedom in response to a motion in an unconstrained degree of freedom. Coupled error motion will be understood to be motion in one unconstrained degree of freedom in response to motion in another unconstrained degree of freedom.

Though smaller than a conventional serial-kinematics design, the conventional parallel-kinematics design generates motion having a variety of error motions. For example, the parallel-kinematics design generates coupled error motion along the second axis in response to movement of the first stage along the first axis. For another example, the conventional parallel-kinematics design generates parasitic error motion, otherwise constrained, as rotation about a third axis orthogonal to the first and second axes in response to unconstrained motion along the first or the second axes. Motion in the constrained degrees of freedom is often undesirable.

It would, therefore, be desirable to provide an apparatus having motion with only pre-determined degrees of freedom and associated constrained degrees of freedom, while minimizing direct, parasitic, and coupled error motions.

SUMMARY OF THE INVENTION

In accordance with the present invention, a motion apparatus includes a first, second, third and fourth flexure, and a first and second intermediate stage. The second and third flexures are coupled to a motion stage. The first, second, third and fourth flexures can be, but are not limited to, arm flexures, parallelogram flexures, or compound parallelogram flexures.

With this particular arrangement, the motion apparatus provides movement of the motion stage such that, when a force is applied to the first intermediate stage along a first axis, the motion stage moves substantially along the first axis. Also, when a force is applied to the second intermediate stage along a second axis, the motion stage moves substantially along the second axis.

In accordance with another aspect of the present invention, the motion apparatus further includes a fifth, sixth, seventh, eighth flexure, and a third and fourth intermediate stage. The sixth and seventh flexures are coupled to the motions stage. The fifth, sixth, seventh, eighth flexures can be arm flexures, parallelogram flexures, or compound parallelogram flexures.

With this particular arrangement, the motion apparatus provides movement of the motion stage such that, when a force is applied to the first or third intermediate stage along the first axis, the motion stage moves more substantially along the first axis. Also, when a force is applied to the second or fourth intermediate stage along the second axis, the motion stage moves substantially along the second axis. With this arrangement, error motions are reduced in comparison with the arrangement described above.

In accordance with yet another aspect of the invention, the first, second, third, fourth, fifth, sixth, seventh, and eighth flexures can be provided having arms comprised of a plurality of members, each member orthogonal to surrounding members.

With this particular arrangement, the motion apparatus provides movement of the motion stage in the direction of a third axis orthogonal to the first and the second axes, as well as rotation about the first and the second axis in response to forces applied, in the direction of the third axis, to one or more of the first, second, third and fourth intermediate stages. Where compound parallelograms are used for the flexures, the forces are applied instead to the third rigid body of the corresponding compound parallelogram flexures. Thus, a five degree of freedom motion apparatus is provided.

The motion apparatus provide motion stages having motion with only pre-determined degrees of freedom and associated constrained degrees of freedom, while minimizing direct, parasitic, and coupled error motions.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Six degrees of freedom of motion are described herein with reference to a Cartesian coordinate system having x, y and z directed axes as is known. The six degrees of motion are thus, linear motion along an x-axis, a y-axis, and a z-axis, and rotational motion about the x-axis, the y-axis, and the z-axis.

The term "primary compliance" is used herein to describe a direction in which a flexure has the most compliance. The flexure can also have compliance in other directions. The terms "fixed stage" and "base" are used herein to describe a mechanical platform having little or no compliance or corresponding motion.

As is known, a variety of types of prior art flexures are used to provide mechanisms that generally move with some constrained and some unconstrained degrees of freedom. Each type of prior art flexure provides different amount of error motions as described in FIGS. 1–3 below.

Figure 1:
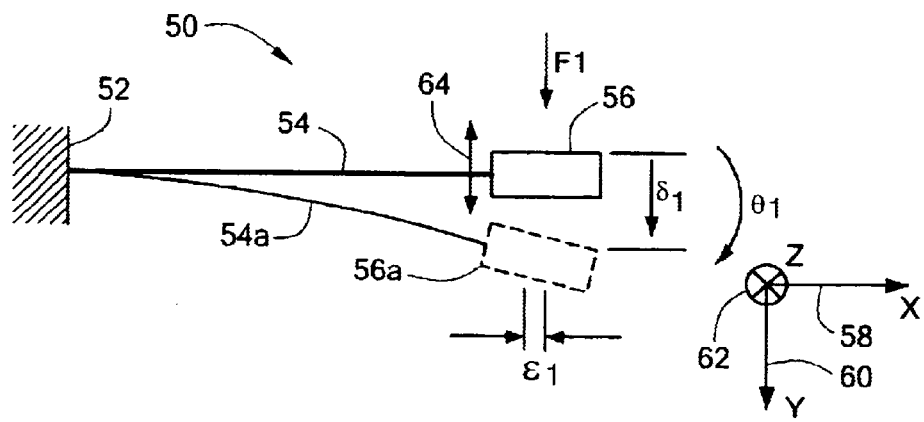
FIG. 1 is a plan view of a prior art arm flexure.

Referring now to FIG. 1, an exemplary arm flexure 50 includes a first rigid body 52, here shown as a base 52, a second rigid body 56, and an arm 54.

The arm 54 can be one of a variety of types of arms. For example, in one embodiment, the arm 54 has a rectangular cross section in the plane defined by a z-axis 62 and a y-axis 60, having a smallest cross sectional dimension in the direction of the y-axis 60, therefore forming a "blade" arm. Having the blade arm 54, the arm flexure has a primary compliance 64, here depicted as a double arrow, in the direction of the y-axis 60. In other embodiments, the arm 54 can have a cross section having any polygonal or rounded shape, that may vary along the length of the arm.

In response to a force F1, the second rigid body 56 moves to a position 56a and the arm 54 bends to an orientation 54a. In so responding, the second rigid body rotates about the z-axis 62 through an angle $\theta 1$, translates along the y-axis 60 with a translation $\delta 1$, and translates along an x-axis 58 with a translation $\epsilon 1$. Therefore, the arm flexure 50 responds to the force F1, the force F1 along the y-axis 60, with motion in three degrees of freedom. It will be appreciated from the discussion above that it would be desirable if the arm flexure 50 moved instead in only one degree of freedom in response to the force F1. Only the translation $\delta 1$ is desirable. Here, the translation $\epsilon 1$ is a parasitic error motion and the rotation $\theta 1$ is a coupled error motion.

Figure 2:
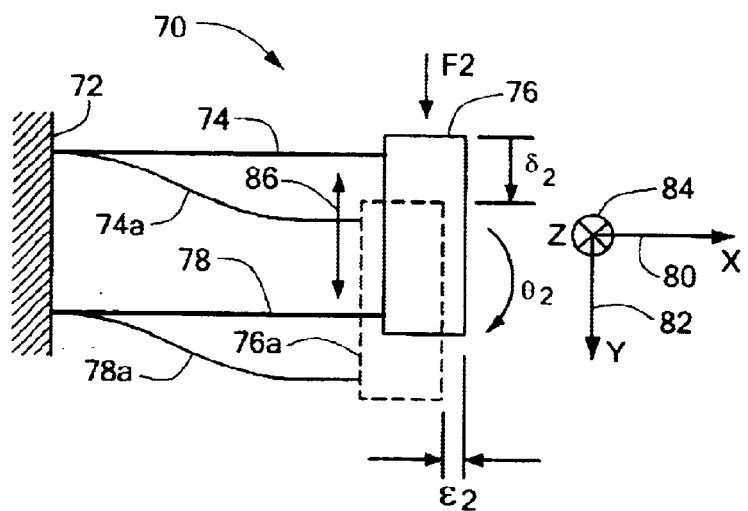
FIG. 2 is a plan view of a prior art parallelogram flexure.

Referring now to FIG. 2 an exemplary prior art parallelogram flexure 70 includes a first rigid body 72, here shown as a base 72, a second rigid body 76, a first arm 74 having a first length; and a second arm 78 having a second length generally equal to the first length. The second arm 78 is generally parallel to the first arm 74.

The first and second arms 74, 78 can be one of a variety of types of arms. For example, in one embodiment, the first and second arms 74, 78 have a rectangular cross section in the plane defined by a z-axis 84 and a y-axis 82, having a smallest cross sectional dimension in the direction of the y-axis 82, therefore forming a "blade" arm. Having the blade arms 74, 78, the compound parallelogram flexure 70 has a primary compliance 86, here depicted as a double arrow, in the direction of the y-axis 82. In other embodiments, the first and the second arms 72, 76 can have a cross section having any polygonal or rounded shape, that may vary along the length of the arm.

In response to a force F2, the second rigid body 76 moves to a position 76a and the arms 74, 78 bend to orientations 74a, 78a. In so responding, the second rigid body 76 rotates about the z-axis 84 through an angle θ2, translates along the y-axis 80 with a translation δ2, and translates along an x-axis 80 with a translation ε2. Therefore, the parallelogram flexure 70 responds to the force F2, the force F2 along the y-axis 82, with motion in three degrees of freedom. It will be appreciated from the discussion above that it would be desirable if the second rigid body 76 moved instead in only one degree of freedom in response to the force F2. Only the translation δ2 is desirable. Here, the translation ε2 and the rotation θ2 are parasitic error motions.

In comparison with the arm flexure 50 of FIG. 1, for the displacement δ2 equal to the displacement δ1, θ2 is substantially less than θ1, and ε2 is substantially similar to ε. Thus, the parallelogram flexure 70 has less error motion than the arm flexure 50 (FIG. 1).

Figure 3:
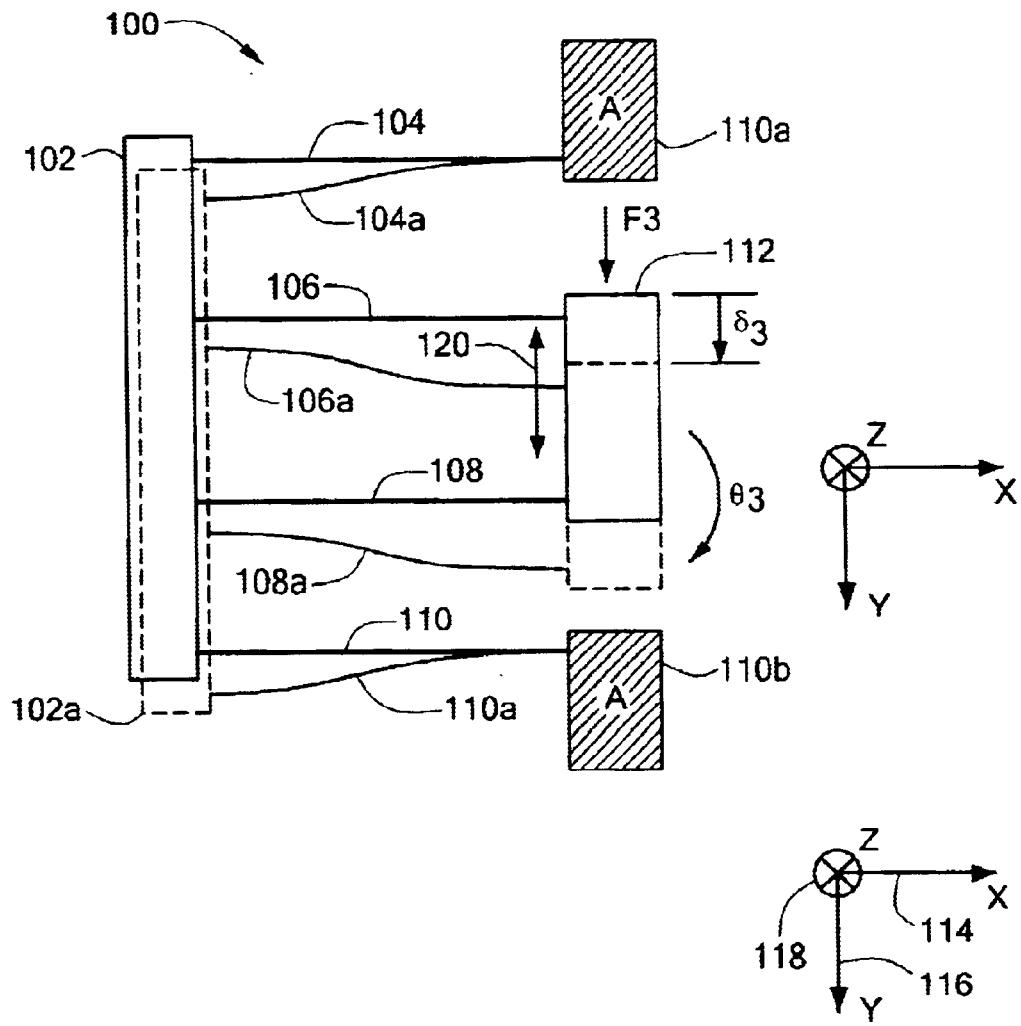
FIG. 3 is a plan view of a prior art compound parallelogram flexure.

Referring now to FIG. 3, an exemplary prior art compound parallelogram flexure 100 includes a first rigid body 110a, 110b, here depicted as two first rigid body portions 110a, 110b. The compound parallelogram flexure 100 also includes a second rigid body 112, a third rigid body 102, a first arm 104 having a first length, a second arm 106 having a second length generally equal to the first length, a third arm 108 having a third length generally equal to the second length, and a fourth arm 110 having a fourth length generally equal to the third length. The first, second, third, and fourth arms generally parallel.

The first, second, third and fourth arms 104, 106, 108, 110 can be one of a variety of types of arms. For example, in one embodiment, the first, second, third and fourth arms 104, 106, 108, 110 have a rectangular cross section in the plane defined by a z-axis 118 and a y-axis 116, having a smallest cross sectional dimension in the direction of the y-axis 116, therefore forming a "blade" arm. Having the blade arms 104, 106, 108, 110, the compound parallelogram flexure 100 has a primary compliance 120, here depicted as a double arrow, in the direction of the y-axis 116. In other embodiments, the first, second, third and fourth arms 104, 106, 108, 110 can have a cross section having any polygonal or rounded shape, that may vary along the length of the arm.

In response to a force F3, the second rigid body 112 moves to a position 112a and the first, second, third and fourth arms 104, 106, 108, 110 bend to respective orientations 104a, 106a, 108a, 110a. In so responding, the second rigid body 112 rotates about the z-axis 118 through an angle θ3, the angle θ3 very small, and translates along the y-axis 116 with a translation δ3. The angle θ3 is substantially similar to the angle θ2 (FIG. 2), both of which are much less than the angle θ1 (FIG. 1). Translation (not shown) along an x-axis 116 is substantially zero. Therefore, the compound parallelogram flexure 100 responds to the force F3, the force F3 along the y-axis 116, with motion in substantially two degrees of freedom. Only the translation δ3 is desirable. Here, the error motion rotation θ3 is very small and error motion translation along the x-axis 116 is substantially zero.

In comparison with the parallelogram flexure 70 of FIG. 2 and the arm flexure 50 of FIG. 1, for the displacement δ3 equal to the displacement δ2 and equal to the displacement δ1, θ3 and θ2 are substantially similar and less than θ1, and translation along the x-axis 114, nearly zero, is less than each of ε2 and ε1. Thus, the compound parallelogram flexure 100 has less error motion than each of the parallelogram flexure 70 (FIG. 2) and the arm flexure 50 (FIG. 1).

Figure 4:
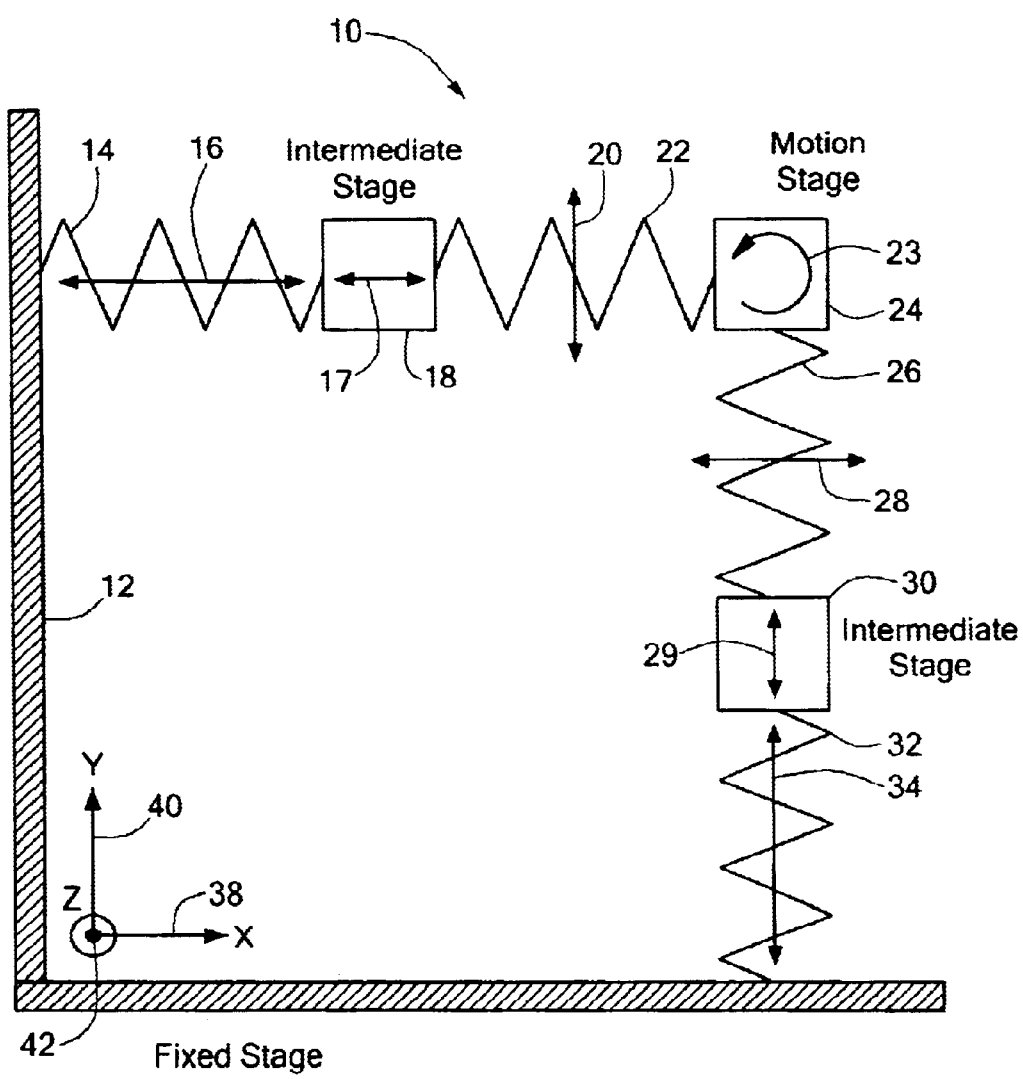
FIG. 4 is a schematic representation of a two-axis flexure mechanism in accordance with the present invention.

Referring now to FIG. 4, an exemplary schematic representation of a two-axis flexure mechanism 10 having a parallel-kinematic topology in accordance with the present invention includes a base 12, a first flexure 14, a first intermediate stage 18, a second flexure 22, a motion stage 24, a third flexure 26, a second intermediate stage 30, and a fourth flexure 32. The first flexure 14 has a primary compliance 16 in the direction of an x-axis 38. The second flexure 22 has a primary compliance 20 in the direction of a y-axis 40. The third flexure 26 has a primary compliance 28 in the direction of the x-axis 38. The fourth flexure 36 has a primary compliance 34 in the direction of the y-axis 38.

Each of the flexures 14, 22, 26, 32, intermediate stages 18, 30, the motion stage 24, and the fixed stage 12 can be comprised of a variety of conventional flexures, including but not limited to, arm flexures (50, FIG. 1), parallelogram flexures (70, FIG. 2), and compound-parallelogram flexures (100, FIG. 3). Some structures using particular flexures are shown in FIGS. 5–13.

In operation, the motion stage 24 moves with a first primary degree of freedom in response to a first force 17 applied to the first intermediate stage 18 in the direction of the x-axis 38. The first primary degree of freedom is substantially in the direction of the first force 17, along the x-axis 38. The motion stage 24 also moves with a second primary degree of freedom in response to a second force 29 applied to the second intermediate stage 30 in the direction of the y-axis 40. The second primary degree of freedom is substantially along the y-axis 40. Thus, the motion stage 24 moves with substantially two degrees of freedom in response to forces 17, 29. While primary degrees of freedom are described, the motion stage 24 can also move with other degrees of freedom considered to be error motions.

A variety of error motions described above can be associated with the motions of the motion stage 24. As described above, error motions can be characterized herein as "direct," "parasitic," and "coupled." Direct error motion will be understood to be motion in a constrained degree of freedom in response to a force in the direction of the constrained degree of freedom. Parasitic error motion will be understood to be motion in a constrained degree of freedom in response to a motion in an unconstrained degree of freedom. Coupled error motion will be understood to be motion in one unconstrained degree of freedom in response to motion in another unconstrained degree of freedom.

The motion stage 24 can have error motions. For example, the motion stage 24 can have direct error motion, wherein the motion stage 24 rotates in response to a rotational force 23 about a z-axis 42. For another example, the motion stage can have parasitic error motion, wherein the motion stage 24 rotates about a z-axis 42 in response to either the first or the second forces 17, 29 described above. For yet another example, the motion stage can have coupled error motion, wherein the motion stage moves along the x-axis 38 in response to the second force 29 on the second intermediate stage 32 in the direction of the y-axis 40. Similarly, the motion stage 24 can move along the y-axis 40 in response to the first force 17 on the first intermediate stage 18 in the direction of the x-axis 38.

The two-axis flexure mechanism 10 is best realized if actuators (not shown) that generate the first force 17 and the second force 29 are stationary relative to the fixed stage 12. Ideally, the actuators are mutually independent, unaffected by the other of the actuators. Thus, as the first force 17 is applied to the first intermediate stage 18, it is desirable that the second intermediate stage 30 not move, particularly in the direction of the x-axis 38.

Similarly, as the second force 29 is applied to the second intermediate stage 30, it is desirable that the first intermediate stage 18 not move, particularly in the direction of the y-axis 40. Thus, ideally, each of the first and the second intermediate stages 18, 30, upon which each of the first and the second forces 17, 29 is applied, do not move in response to the other of the first and the second forces 17, 29.

Furthermore, it is also desirable that the first intermediate stage 18 move primarily in the direction of the x-axis 38, and not move in the direction of the y-axis 40, in response to the first force 17. Similarly, it is desirable that the second intermediate stage 30 move primarily in the direction of the y-axis 40, and not move in the direction of the x-axis 38, in response to the second force 29.

If the first, second, third, and fourth flexures 14, 22, 26, 32 have low error motions, and substantially one degree of freedom, corresponding to translation along the respective primary compliance 16, 20, 28, 34, then the error motions in the two-axis flexure mechanism 10 described above are reduced. Furthermore, the movement of each of the first and the second intermediate stages 18, 30 in response to the first or the second force 17, 29 applied to the other of the first and the second intermediate stages 18, 30 is reduced. Also, the motion of the first intermediate stage 18 in the direction of the y-axis 40 in response to the first force 17, and the motion of the second intermediate stage 30 in the direction of the x-axis 38 in response to the second force 29 are both reduced.

Each of the flexures shown in FIGS. 1–3 can be used to provide the first, second, third, and fourth flexures 14, 22, 26, and 32. However, as described above in conjunction with FIGS. 1–3, conventional flexures have various amounts of flexure error motions depending upon the type of flexure, including, but not limited to, direct, parasitic, and coupled error motions. Thus, the motion stage 24 has various amounts of motion error in response to the forces 17, 29, in accordance with the type of flexures used.

The arm flexure 50 of FIG. 1 can be used in the two-axis flexure mechanism 10 as the first, second, third, and fourth flexures 14, 22, 26, 32. In this embodiment, the first rigid body 52 (FIG. 1) of the first flexure 14 corresponds to the base 12, the second rigid body 56 (FIG. 1) of the first flexure 14 corresponds to the first intermediate stage 18, the first rigid body 52 of the second flexure 22 corresponds to the first intermediate stage 18, the second rigid body 56 of the second flexure 22 corresponds to the motion stage 24, the first rigid body 52 of third flexure 26 corresponds to the second intermediate stage 30, the second rigid body 56 of third flexure 26 corresponds to the motion stage 24, the first rigid body 52 of fourth flexure 32 corresponds to the base 12, and the second rigid body 56 of fourth flexure 32 corresponds to the second intermediate stage 30.

In another embodiment, the parallelogram flexure 70 of FIG. 2 can be used as the first, second, third, and fourth flexures 14, 22, 26, 32. In this embodiment, the first rigid body 72 (FIG. 2) of the first flexure 14 corresponds to the base 12, the second rigid body 76 (FIG. 2) of the first flexure 14 corresponds to the first intermediate stage 18, the first rigid body 72 of the second flexure 22 corresponds to the first intermediate stage 18, the second rigid body 76 of the second flexure 22 corresponds to the motion stage 24, the first rigid body 72 of third flexure 26 corresponds to the second intermediate stage 30, the second rigid body 76 of the third flexure 26 corresponds to the motion stage 24, the first rigid body 72 of fourth flexure 32 corresponds to the base 12, and the second rigid body 76 of fourth flexure 32 corresponds to the second intermediate stage 30.

In yet another embodiment, the compound parallelogram flexure 100 or FIG. 3 can be used as the first, second, third, and fourth flexures 14, 22, 26, 32. In this embodiment, the first rigid body 110a, 110b (FIG. 3) of the first flexure 14 corresponds to the base 12, the second rigid body 112 (FIG. 3) of the first flexure 14 corresponds to the first intermediate stage 18, the first rigid body 110a, 110b of the second flexure corresponds to the first intermediate stage 18, the second rigid body 112 of the second flexure 22 corresponds to the motion stage 24, the first rigid body 110a, 110b of the third flexure 26 corresponds to the second intermediate stage 30, the second rigid body 112 of the third flexure 26 corresponds to the motion stage 24, the first rigid body 110a, 110b of the fourth flexure 32 corresponds to the base 12, and the second rigid body 112 of the fourth flexure 32 corresponds to the second intermediate stage 30.

Figure 5:
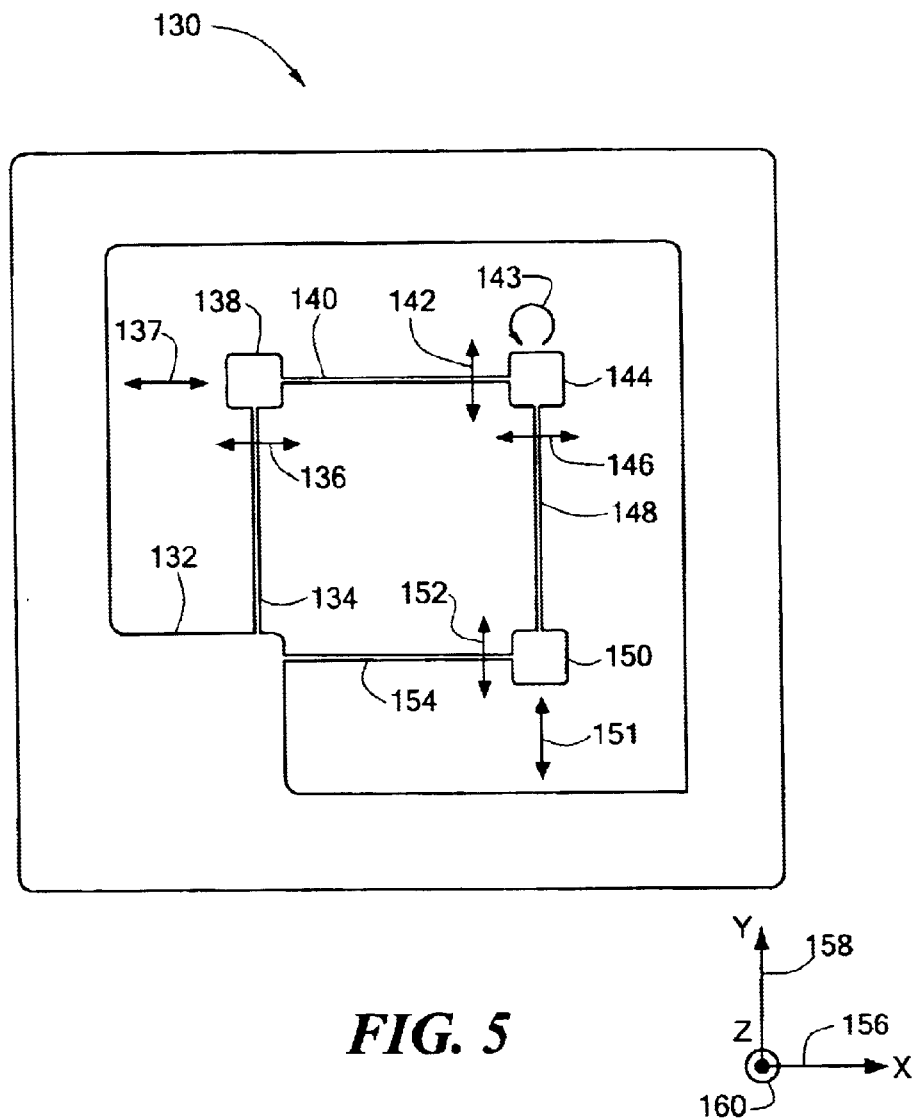
FIG. 5 is a plan view of a motion apparatus having four arm flexures in accordance with the present invention.
Figure 6:
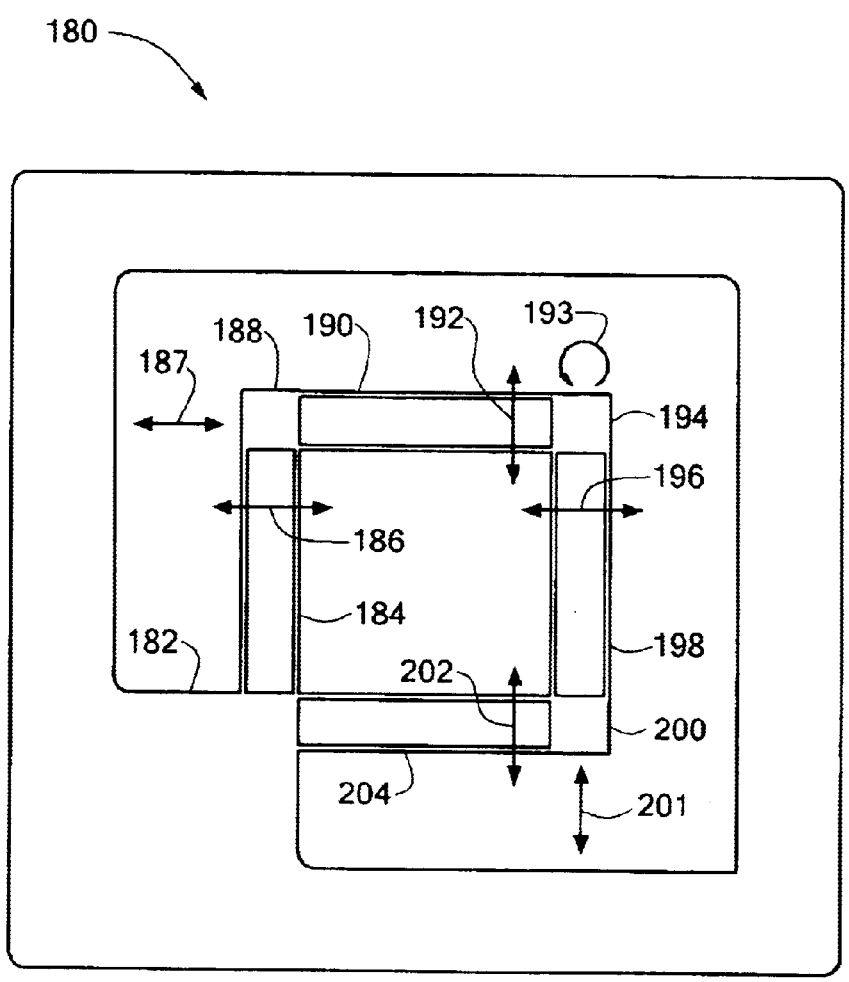
FIG. 6 is a plan view of an alternate motion apparatus having four parallelogram flexures in accordance with the present invention.
Figure 6:
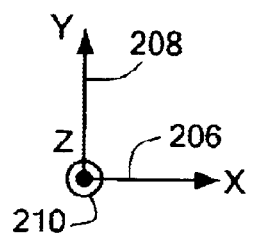
Figure 7:
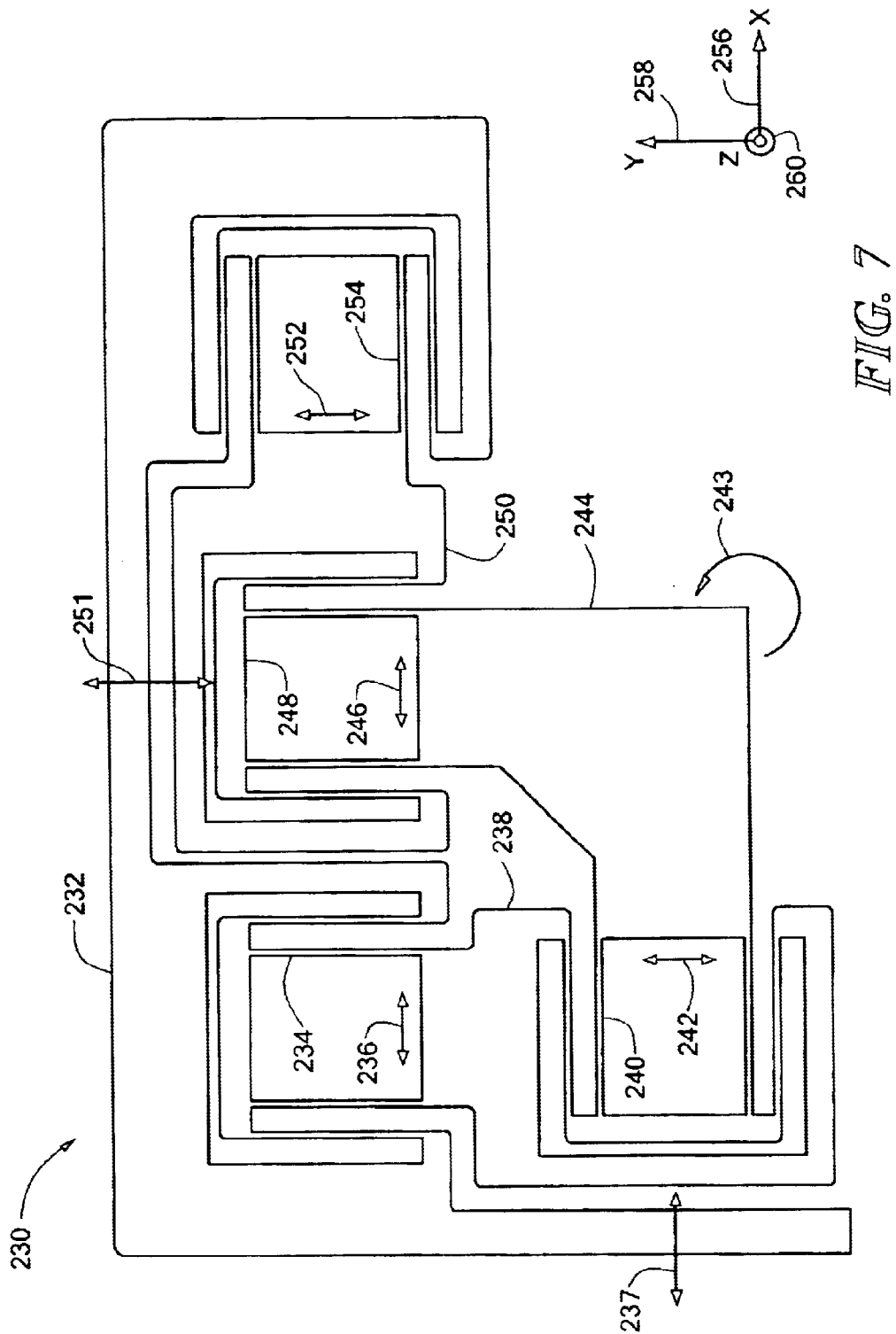
FIG. 7 is a plan view of yet another alternate motion apparatus having four compound parallelogram flexures in accordance with the present invention.

The two-axis flexure mechanism 10 having various types of flexures is further described in FIGS. 5–7.

Referring now to FIG. 5, an exemplary motion apparatus 130 includes a base 132, a first arm flexure 134, a first intermediate stage 138, a second arm flexure 140, a motion stage 144, a third arm flexure 148, a second intermediate stage 150, and a fourth arm flexure 154. The first, second, third, and fourth arm flexures 134, 140, 148, 154 can be the type of arm flexure 50 described in association with FIG. 1.

The first arm flexure 134, the first intermediate stage 138, the second arm flexure 140, the motion stage 144, the third arm flexure 148, the second intermediate stage 150, and the fourth arm flexure 154 lie substantially in a plane defined by an x-axis 156 and a y-axis 158.

The first and third arm flexures 134, 148 have a primary compliance 136, 148, respectively, in the direction of the x-axis 156. The second and fourth arm flexures 140, 154 have a primary compliance 142, 152, respectively, in the direction of the y-axis 158.

In operation, the motion stage 144 moves with a first primary degree of freedom in response to a first force 137 applied to the first intermediate stage 138 in the direction of the x-axis 156. The first primary degree of freedom is substantially in the direction of the first force 137, along the x-axis 156. The motion stage 144 also moves with a second primary degree of freedom in response to a second force 151 applied to the second intermediate stage 150 in the direction of the y-axis 158. The second primary degree of freedom is substantially along the y-axis 158. Thus, the motion stage 144 moves with substantially two degrees of freedom in response to forces 137, 151.

Direct, parasitic, and coupled error motions, each described above, can be associated with the motions of the motion stage 144. For example, the motion stage 144 can have direct error motion, wherein the motion stage 144 rotates in response to a rotational force 143 about a z-axis 160. For another example, the motion stage 144 can have parasitic error motion, wherein the motion stage 144 rotates about the z-axis 160 in response to either the first or the second forces 137, 151 described above. For yet another example, the motion stage can have coupled error motion, wherein the motion stage moves along the x-axis 156 in response to the second force 151 on the second intermediate stage 150 in the direction of the y-axis 158. Similarly, the motion stage 144 can move along the y-axis 158 in response to the first force 137 on the first intermediate stage 138 in the direction of the x-axis 156.

As described above, the motion apparatus 130 is best realized if actuators that generate the first force 137 and the second force 151 are stationary relative to the base 132. Ideally, the actuators are mutually independent, unaffected by the other of the actuators. Thus, as the first force 137 is applied to the first intermediate stage 138, it is desirable that the second intermediate stage 150 not move, particularly in the direction of the x-axis 156. Similarly, as the second force 151 is applied to the second intermediate stage 150, it is desirable that the first intermediate stage 134 not move, particularly in the direction of the y-axis 158. Here, due to the direct, parasitic, and coupled error motions, the first and the second intermediate stages 138, 150 and thus the actuators that apply force to the actuators 138,150, are only partially mutually independent.

Also as described above, it is desirable that the first intermediate stage 138 move primarily in the direction of the x-axis 156, and not move in the direction of the y-axis 158, in response to the first force 137. Similarly, it is desirable that the second intermediate stage 150 move primarily in the direction of the y-axis 158, and not move in the direction of the x-axis 156, in response to the second force 151. Here, while the first intermediate stage 138 moves primarily in the direction of the x-axis 156 in response to the first force 13, it also moves in the direction of the y-axis 1587. Similarly, while the second intermediate stage 150 moves primarily in the direction of the y-axis 158 in response to the second force 151, it also moves in the direction of the x-axis 156.

As described above, if the first, second, third, and fourth arm flexures 134, 142, 148, 154 had only one degree of freedom, the one degree of freedom being translation along the respective primary compliances 136, 142, 146, 152, then the error motions described above would be reduced. Furthermore, the movement of each of the first and the second intermediate stages 138, 150 in response to the first or the second force 137, 151 applied to the other of the first and the second intermediate stages 138, 150 would also be reduced. Also, the motion of the first intermediate stage 138 in the direction of the y-axis 158 in response to the first force 137, and the motion of the second intermediate stage 150 in the direction of the x-axis 156 in response to the second force 151 would also be reduced. However, as described above, the arm flexure (50, FIG. 1) has flexure error motions. Thus, the motion stage 144 exhibits error motions in response to the first and second forces 137, 151. However, the motion apparatus 130 provides an embodiment that can be applied to some applications where a two-axis planar flexural mechanism is required.

While each of the first and the third arm flexures 134, 148 are shown to be orthogonal to each of the second the fourth flexure 140, 154, each of the first and the third arm flexures 134, 148 can be at other angles relative to each of the second and the fourth arm flexures 140, 154.

Referring now to FIG. 6, an exemplary alternate motion apparatus 180 includes a base 182, a first parallelogram flexure 184, a first intermediate stage 188, a second parallelogram flexure 190, a motion stage 194, a third parallelogram flexure 198, a second intermediate stage 200, and a fourth parallelogram flexure 204. The first, second third, and fourth parallelogram flexures 184, 190, 198, 204 can be similar to the parallelogram flexure 70 described in association with FIG. 2.

The first parallelogram flexure 184, the first intermediate stage 188, the second parallelogram flexure 190, the motion stage 194, the third parallelogram flexure 198, the second intermediate stage 200, and the fourth parallelogram flexure 204 lie substantially in a plane defined by an x-axis 206 and a y-axis 208.

The first and third parallelogram flexures 184, 198 have a primary compliance 186, 196, respectively, in the direction of the x-axis 206. The second and fourth parallelogram flexures 190, 204 have a primary compliance 192, 202, respectively, in the direction of the y-axis 208.

In operation, the motion stage 194 moves with a first primary degree of freedom in response to a first force 187 applied to the first intermediate stage 188 in the direction of the x-axis 206. The first primary degree of freedom is substantially in the direction of the first force 187, along the x-axis 206. The motion stage 194 also moves with a second primary degree of freedom in response to a second force 201 applied to the second intermediate stage 200 in the direction of the y-axis 208. The second primary degree of freedom is substantially along the y-axis 208. Thus, the motion stage 194 moves with substantially two degrees of freedom in response to forces 187, 201.

Direct, parasitic, and coupled error motions, each described above, can be associated with the motions of the motion stage 194. For example, the motion stage 194 can have direct error motion, wherein the motion stage 194 rotates in response to a rotational force 193 about the z-axis 210. For another example, the motion stage 194 can have parasitic error motion, wherein the motion stage 194 rotates about the z-axis 210 in response to either the first or the second forces 187, 201 described above. For yet another example, the motion stage can have coupled error motion, wherein the motion stage moves along the x-axis 206 in response to the second force 201 on the second intermediate stage 200 in the direction of the y-axis 208. Similarly, the motion stage 194 can move along the y-axis 208 in response to the first force 187 on the first intermediate stage 188 in the direction of the x-axis 206.

As described above, the alternate motion apparatus 180 is best realized if actuators that generate the first force 187 and the second force 201 are stationary relative to the base 182. Ideally, the actuators are mutually independent, unaffected by the other of the actuators. Thus, as the first force 187 is applied to the first intermediate stage 188, it is desirable that the second intermediate stage 200 not move, particularly in the direction of the x-axis 206. Similarly, as the second force 201 is applied to the second intermediate stage 200, it is desirable that the first intermediate stage 184 not move, particularly in the direction of the y-axis 208. Here, due to the direct, parasitic, and coupled error motions, the first and the second intermediate stages 188, 200 and thus the actuators that apply force to the first and the second intermediate stages 188, 200 are only partially mutually independent.

Also as described above, it is desirable that the first intermediate stage 188 move primarily in the direction of the x-axis 206, and not move in the direction of the y-axis 208, in response to the first force 187. Similarly, it is desirable that the second intermediate stage 200 move primarily in the direction of the y-axis 208, and not move in the direction of the x-axis 206, in response to the second force 201. Here, while the first intermediate stage 188 moves primarily in the direction of the x-axis 206 in response to the first force 187, it also moves in the direction of the y-axis 208. Similarly, while the second intermediate stage 200 moves primarily in the direction of the y-axis 208 in response to the second force 201, it also moves in the direction of the x-axis 206.

As described above, if the first, second, third, and fourth parallelogram flexures 184, 190, 198, 204 had only one degree of freedom, the one degree of freedom being translation along the respective primary compliances 186, 192, 196, 202, then the error motions described above would be reduced. Furthermore, the movement of each of the first and the second intermediate stages 188, 200 in response to the first or the second force 187, 201 applied to the other of the first and the second intermediate stages 188, 200 would be reduced. Also, the motion of the first intermediate stage 188 in the direction of the y-axis 208 in response to the first force 187, and the motion of the second intermediate stage 200 in the direction of the x-axis 206 in response to the second force 201 would also be reduced. However, as described above, the parallelogram flexure (50, FIG. 2) has flexure error motions, though less than the arm flexure (30, FIG. 1). Thus, the motion stage 194 exhibits error motions in response to the first and second forces 187, 201, though the error motions are less than those of the motion apparatus 130 of FIG. 5. Like the motion apparatus 130 of FIG. 5, the alternate motion apparatus 180 provides an embodiment that can be applied to some applications where a two-axis planar flexural mechanism is required.

While each of the first and the third parallelogram flexures 184, 198 are shown to be orthogonal to each of the second the fourth flexure 190, 204, each of the first and the third parallelogram flexures 184, 198 can be at other angles relative to each of the second and the fourth parallelogram flexures 190, 204.

Referring now to FIG. 7, another exemplary alternate motion apparatus 230 includes a base 232, a first compound parallelogram flexure 234, a first intermediate stage 238, a second compound parallelogram flexure 240, a motion stage 244, a third compound parallelogram flexure 248, a second intermediate stage 250, and a fourth compound parallelogram flexure 254. The first, second, third, and fourth compound parallelogram flexures 234, 240, 248, 254 can be similar to the compound parallelogram flexure 100 described in association with FIG. 3.

The first compound parallelogram flexure 234, the first intermediate stage 238, the second compound parallelogram flexure 240, the motion stage 244, the third compound parallelogram flexure 248, the second intermediate stage 250, and the fourth compound parallelogram flexure 254 lie substantially in a plane, the plane defined by an x-axis 256 and a y-axis 258.

The first and third compound parallelogram flexures 234, 248 have a primary compliance 236, 246, respectively, in the direction of the x-axis 256. The second and fourth compound parallelogram flexures 240, 254 have a primary compliance 242, 252, respectively, in the direction of the y-axis 258.

In operation, the motion stage 244 moves with a first primary degree of freedom in response to a first force 237 applied to the first intermediate stage 238 in the direction of the x-axis 256. The first primary degree of freedom is substantially in the direction of the first force 237, along the x-axis 256. The motion stage 244 also moves with a second primary degree of freedom in response to a second force 251 applied to the second intermediate stage 250 in the direction of the y-axis 258. The second primary degree of freedom is substantially along the y-axis 258. Thus, the motion stage 244 moves with substantially two degrees of freedom in response to forces 237, 251.

Direct, parasitic, and coupled error motions, each described above, can be associated with the motions of the motion stage 244. For example, the motion stage 244 can have direct error motion, wherein the motion stage 244 rotates in response to a rotational force 243 about a z-axis 260. For another example, the motion stage 244 can have parasitic error motion, wherein the motion stage 244 rotates about the z-axis 260 in response to either the first or the second forces 237, 251. For yet another example, the motion stage can have coupled error motion, wherein the motion stage moves along the x-axis 256 in response to the second force 251 on the second intermediate stage 250 in the direction of the y-axis 258. Similarly, the motion stage 244 can move along the y-axis 258 in response to the first force 237 on the first intermediate stage 238 in the direction of the x-axis 256.

As described above, the alternate motion apparatus 230 is best realized if actuators that generate the first force 237 and the second force 251 are stationary relative to the base 232. Ideally, the actuators are mutually independent, unaffected by the other of the actuators. Thus, as the first force 237 is applied to the first intermediate stage 238, it is desirable that the second intermediate stage 250 not move, particularly in the direction of the x-axis 256. Similarly, as the second force 251 is applied to the second intermediate stage 250, it is desirable that the first intermediate stage 234 not move, particularly in the direction of the y-axis 258. Here, due to the small direct, parasitic, and coupled error motions, the first and the second intermediate stages 238, 250 and thus the actuators (not shown) that apply forces to the first and the second intermediate stages 238, 250 are substantially independent.

Also as described above, it is desirable that the first intermediate stage 238 move primarily in the direction of the x-axis 256, and not move in the direction of the y-axis 258, in response to the first force 237. Similarly, it is desirable that the second intermediate stage 250 move primarily in the direction of the y-axis 258, and not move in the direction of the x-axis 256, in response to the second force 251. Here, while the first intermediate stage 238 moves primarily in the direction of the x-axis 256 in response to the first force 237, it also moves in the direction of the y-axis 258. Similarly, while the second intermediate stage 250 moves primarily in the direction of the y-axis 258 in response to the second force 251, it also moves in the direction of the x-axis 256.

As described above, if the first, second, third, and fourth compound parallelogram flexures 234, 240, 248, 254 had only one degree of freedom, the one degree of freedom being translation along the respective primary compliance 236, 242, 246, 252, then the error motions described above would be reduced. Furthermore, the movement of each of the first and the second intermediate stages 238, 250 in response to the first or the second force 237, 251 applied to the other of the first and the second intermediate stages 238, 250 would be reduced. Also, the motion of the first intermediate stage 238 in the direction of the y-axis 258 in response to the first force 237, and the motion of the second intermediate stage 250 in the direction of the x-axis 256 in response to the second force 251 would also be reduced. The compound parallelogram flexure (100, FIG. 3) has small error motions, the error motions smaller than the parallelogram flexure (50, FIG. 2), and smaller than the arm flexure (30, FIG. 1). Thus, the motion stage 244 exhibits very small error motions in response to the first and second forces 237, 251. The error motions of the motion apparatus 230 are less than those of the motion apparatus 180 of FIG. 6 and the motion apparatus 130 of FIG. 5. The alternate motion apparatus 230 provides an embodiment that can be applied to many applications where a two-axis planar flexural mechanism is required.

While each of the first and the third compound parallelogram flexures 234, 248 are shown to be orthogonal to each of the second the fourth flexures 240, 254, each of the first and the third compound parallelogram flexures 234, 248 can be at other angles relative to each of the second and the fourth compound parallelogram flexures 240, 254.

Figure 8:
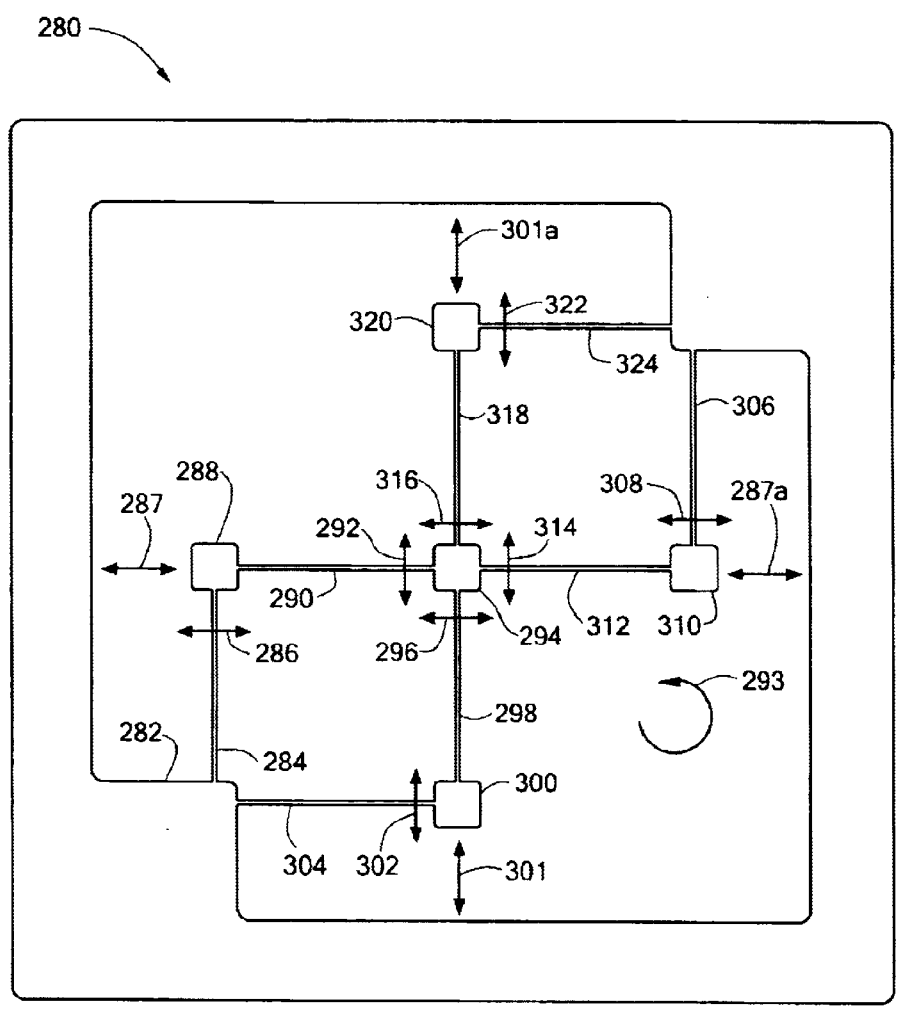
FIG. 8 is a plan view of yet another alternate motion apparatus having eight arm flexures in accordance with the present invention.
Figure 8:
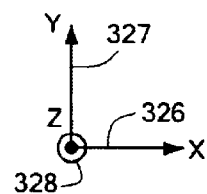

Referring now to FIG. 8, another alternate motion apparatus 280 includes a base 282, a first arm flexure 284, a first intermediate stage 288, a second arm flexure 290, a motion stage 294, a third arm flexure 298, a second intermediate stage 300, a fourth arm flexure 304, a fifth arm flexure 306, a third intermediate stage 310, a sixth arm flexure 312, a seventh arm flexure 318, a fourth intermediate stage 320, and an eighth arm flexure 324. The first through the eighth arm flexures 284, 290, 298, 304, 306, 312, 318, 324 can be the type of arm flexure 50 described in association with FIG. 1.

The first arm flexure 284, the first intermediate stage 288, the second arm flexure 290, the motion stage 294, the third arm flexure 298, the second intermediate stage 300, the fourth arm flexure 304, the fifth arm flexure 306, the third intermediate stage 310, the sixth arm flexure 312, the seventh arm flexure 318, the fourth intermediate stage 320, and the eighth arm flexure 324 lie substantially in a plane, the plane defined by an x-axis 326 and a y-axis 327.

The first arm flexure 284 and the fifth arm flexure 306 have respective primary compliances 286, 308 in the direction of the x-axis 326. The second arm flexure 290 and the sixth arm flexure 312 have respective primary compliances 292, 314 in the direction of the y-axis 327. The third arm flexure 298 and the seventh arm flexure 318 have respective primary compliances 296, 316 in the direction of the x-axis 326. The fourth arm flexure 304 and the eighth arm flexure 324 have respective primary compliances 302, 322 in the direction of the y-axis 327.

In operation, the motion stage 294 moves with a first primary degree of freedom in response to a first force 287 applied to the first intermediate stage 288 in the direction of the x-axis 326. The first primary degree of freedom is substantially in the direction of the first force 287, along the x-axis 326. The motion stage 294 also moves with a second primary degree of freedom in response to a second force 301 applied to the second intermediate stage 300 in the direction of the y-axis 327. The second primary degree of freedom is substantially along the y-axis 327. Thus, the motion stage 294 moves with substantially two degrees of freedom in response to forces 287, 301. A complimentary first force 287a applied to the third intermediate stage 310 in the direction of the x-axis 326 generates the same motion of the motion stage as the first force 287. A complimentary second force 301a applied to the fourth intermediate stage 320 in the direction of the y-axis 327 generates the same motion of the motion stage as the second force 301.

Direct, parasitic, and coupled error motions, each described above, can be associated with the motions of the motion stage 294. For example, the motion stage 294 can have direct error motion, wherein the motion stage 294 rotates in response to a rotational force 293 about a z-axis 328. For another example, the motion stage 294 can have parasitic error motion, wherein the motion stage 294 rotates about the z-axis 328 in response to either the first or the second forces 287, 301 described above. For yet another example, the motion stage can have coupled error motion, wherein the motion stage moves along the x-axis 326 in response to the second force 301 on the second intermediate stage 300 in the direction of the y-axis 327. Similarly, the motion stage 294 can move along the y-axis 327 in response to the first force 287 on the first intermediate stage 288 in the direction of the x-axis 326.

As described above, the motion apparatus 280 is best realized if actuators that generate the first force 287 and the second force 301 are stationary relative to the base 282. Ideally, the actuators are mutually independent, unaffected by the other of the actuators. Thus, as the first force 287 is applied to the first intermediate stage 288, it is desirable that the second intermediate stage 300 not move, particularly in the direction of the x-axis 326. Similarly, as the second force 301 is applied to the second intermediate stage 300, it is desirable that the first intermediate stage 284 not move, particularly in the direction of the y-axis 327. Here, due to the direct, parasitic, and coupled error motions, the first and the second intermediate stages 288, 300 and thus the actuators that apply forces to the first and the second intermediate stages 288, 300, are only partially mutually independent.

Also as described above, it is desirable that the first intermediate stage 288 move primarily in the direction of the x-axis 326, and not move in the direction of the y-axis 327, in response to the first force 287. Similarly, it is desirable that the second intermediate stage 300 move primarily in the direction of the y-axis 327, and not move in the direction of the x-axis 326, in response to the second force 301. Here, while the first intermediate stage 288 and the third intermediate stage 310 move primarily in the direction of the x-axis 326 in response to the first force 287, they also move in the direction of the y-axis 327. Similarly, while the second intermediate stage 300 and the fourth intermediate stages 320 move primarily in the direction of the y-axis 327 in response to the second force 301, they also move in the direction of the x-axis 326.

If the arm flexures 284, 292, 298, 304, 306, 312, 318, 324 had only one degree of freedom, the one degree of freedom being translation along the respective primary compliances 286, 292, 296, 302, 308, 314, 316, 322, then the error motions described above would be reduced. Furthermore, the movement of each of the first and the second intermediate stages 288, 300 in response to the first or the second force 287, 301 applied to the other of the first and the second intermediate stages 288, 300 would also be reduced. Also, the motion of the first intermediate stage 288 and the third intermediate stage 310 in the direction of the y-axis 327 in response to the first force 287, and the motion of the second intermediate stage 300 and the fourth intermediate stage 320 in the direction of the x-axis 326 in response to the second force 301 would also be reduced. However, as described above, the arm flexure (50, FIG. 1) has flexure error motions. Thus, the motion stage 294 has error motions in response to the first and second forces 287, 301. However, due to the geometric symmetry afforded by the fifth, sixth, seventh, and eighth arm flexures 306, 312, 318, 324, the error motions of the motion stage are reduced more than those of the motion stage 144 of FIG. 5.

While each of the first, third, fifth and seventh arm flexures 284, 298, 306, 318 are shown to be orthogonal to each of the second, fourth, sixth and eighth arm flexures 290, 304, 312, 324 each of the first, third, fifth and seventh arm flexures 284, 298, 306, 318 can be at other angles relative to each of the second, fourth, sixth and eighth are flexures 290, 304, 312, 324.

Figure 9:
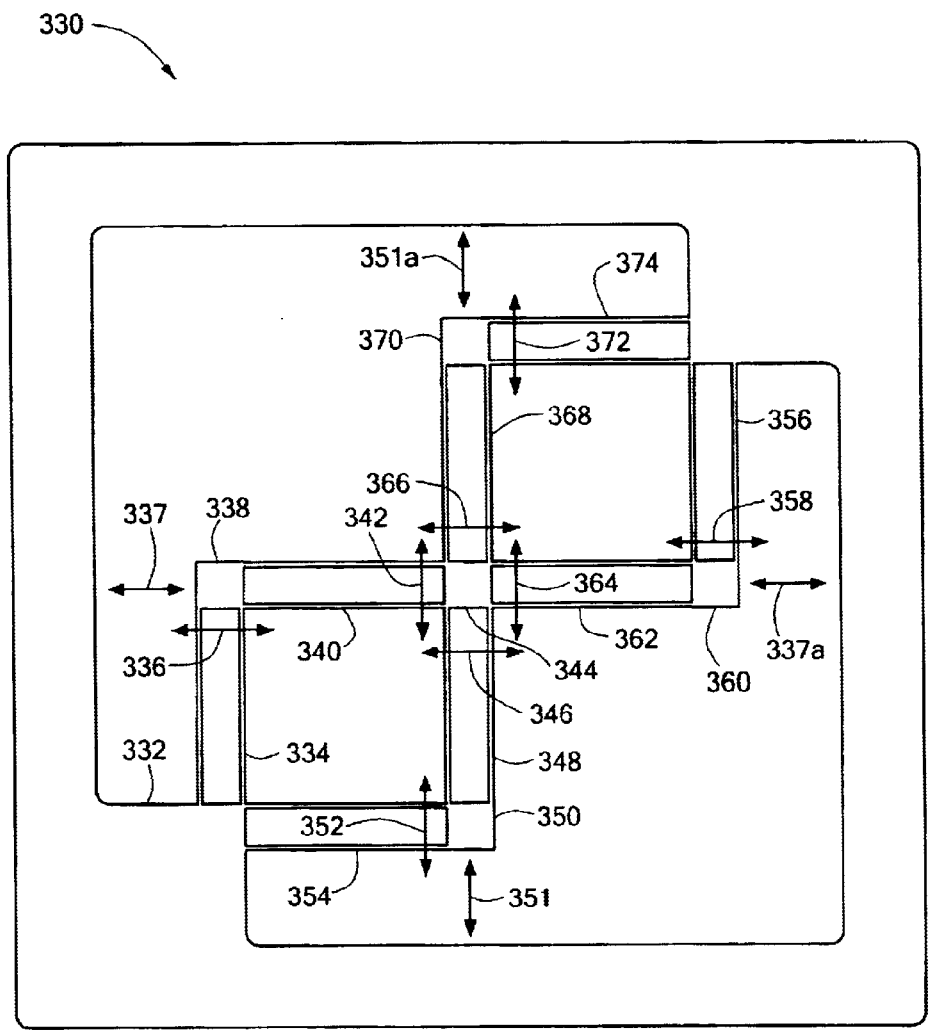
FIG. 9 is a plan view of yet another alternate motion apparatus having eight parallelogram flexures in accordance with the present invention.

Referring now to FIG. 9, yet another alternate motion apparatus 330 includes a base 332, a first parallelogram flexure 334, a first intermediate stage 338, a second parallelogram flexure 340, a motion stage 344, a third parallelogram flexure 348, a second intermediate stage 350, a fourth parallelogram flexure 354, a fifth parallelogram flexure 356, a third intermediate stage 360, a sixth parallelogram flexure 362, a seventh parallelogram flexure 368, a fourth intermediate stage 370, and an eighth parallelogram flexure 374. The first through the eighth parallelogram flexures 334, 340, 348, 354, 356, 362, 368, 374 can be the type of parallelogram flexure 70 described in association with FIG. 2.

The first parallelogram flexure 334, the first intermediate stage 338, the second parallelogram flexure 340, the motion stage 344, the third parallelogram flexure 348, the second intermediate stage 350, the fourth parallelogram flexure 354, the fifth parallelogram flexure 356, the third intermediate stage 360, the sixth parallelogram flexure 362, the seventh parallelogram flexure 368, the fourth intermediate stage 370, and the eighth parallelogram flexure 374 lie substantially in a plane, the plane defined by an x-axis 376 and a y-axis 377.

The first parallelogram flexure 334 and the fifth parallelogram flexure 356 have respective primary compliances 336, 358 in the direction of the x-axis 376. The second parallelogram flexure 340 and the sixth parallelogram flexure 362 have respective primary compliances 342, 364 in the direction of the y-axis 377. The third parallelogram flexure 348 and the seventh parallelogram flexure 368 have respective primary compliances 346, 366 in the direction of the x-axis 376. The fourth parallelogram flexure 354 and the eighth parallelogram flexure 374 have respective primary compliances 352, 372 in the direction of the y-axis 377.

In operation, the motion stage 344 moves with a first primary degree of freedom in response to a first force 337 applied to the first intermediate stage 338 in the direction of the x-axis 376. The first primary degree of freedom is substantially in the direction of the first force 337, along the x-axis 376. The motion stage 344 also moves with a second primary degree of freedom in response to a second force 351 applied to the second intermediate stage 350 in the direction of the y-axis 377. The second primary degree of freedom is substantially along the y-axis 377. Thus, the motion stage 344 moves with substantially two degrees of freedom in response to forces 337, 351. A complimentary first force 337a applied to the third intermediate stage 360 in the direction of the x-axis 376 generates the same motion of the motion stage as the first force 337. A complimentary second force 351a applied to the fourth intermediate stage 370 in the direction of the y-axis 377 generates the same motion of the motion stage as the second force 351.

Direct, parasitic, and coupled error motions, each described above, can be associated with the motions of the motion stage 344. For example, the motion stage 344 can have direct error motion, wherein the motion stage 344 rotates in response to a rotational force 343 about a z-axis 378. For another example, the motion stage 344 can have parasitic error motion, wherein the motion stage 344 rotates about the z-axis 378 in response to either the first or the second forces 337, 351 described above. For yet another example, the motion stage can have coupled error motion, wherein the motion stage moves along the x-axis 376 in response to the second force 351 on the second intermediate stage 350 in the direction of the-y-axis 377. Similarly, the motion stage 344 can move along the y-axis 377 in response to the first force 337 on the first intermediate stage 338 in the direction of the x-axis 376.

As described above, the motion apparatus 330 is best realized if actuators that generate the first force 337 and the second force 351 are stationary relative to the base 332. Ideally, the actuators are mutually independent, unaffected by the other of the actuators. Thus, as the first force 337 is applied to the first intermediate stage 338, it is desirable that the second intermediate stage 350 not move, particularly in the direction of the x-axis 376. Similarly, as the second force 351 is applied to the second intermediate stage 350, it is desirable that the first intermediate stage 334 not move, particularly in the direction of the y-axis 377. Here, due to the direct, parasitic, and coupled error motions, the first through the fourth intermediate stages 338, 350, 360, 370 and thus the actuators that apply force to the intermediate stages 338, 350, 360, 370, are only partially mutually independent.

Also as described above, it is desirable that the first intermediate stage 338 move primarily in the direction of the x-axis 376, and not move in the direction of the y-axis 377, in response to the first force 337. Similarly, it is desirable that the second intermediate stage 350 move primarily in the direction of the y-axis 377, and not move in the direction of the x-axis 376, in response to the second force 351. Here, while the first intermediate stage 338 and the third intermediate stage 360 move primarily in the direction of the x-axis 376 in response to the first force 337, they also move in the direction of the y-axis 377. Similarly, while the second intermediate stage 350 and the fourth intermediate stages 370 move primarily in the direction of the y-axis 377 in response to the second force 351, they also move in the direction of the x-axis 376.

As described above, if the parallelogram flexures 334, 342, 348, 354, 356, 362, 368, 374 had only one degree of freedom, the one degree of freedom being translation along the respective primary compliances 336, 342, 346, 352, 358, 364, 366, 372 then the error motions described above would be reduced. Furthermore, the movement of each of the first and the second intermediate stages 338, 350 in response to the first or the second force 337, 351 applied to the other of the first and the second intermediate stages 338, 350 would also be reduced. Also, the motion of the first intermediate stage 338 and the third intermediate stage 360 in the direction of the y-axis 377 in response to the first force 337, and the motion of the second intermediate stage 350 and the fourth intermediate stage 370 in the direction of the x-axis 376 in response to the second force 351 would also be reduced. However, as described above, the parallelogram flexure (70, FIG. 2) has flexure error motions. Thus, the motion stage 344 has error motions in response to the first and second forces 337, 351. However, due to the geometric symmetry afforded by the fifth, sixth, seventh, and eighth parallelogram flexures 356, 362, 368, 374, the error motion of the motion stage are reduced more than those of the motion stage 194 of FIG. 6. Since the parallelogram flexure 70 (FIG. 2) has less error motion than the arm flexure 50 (FIG. 1), the motion stage 344 of the motion apparatus 330 has less error motion than the motion stage 294 (FIG. 8).

While each of the first, third, fifth and seventh parallelogram flexures 334, 348, 356, 368 are shown to be orthogonal to each of the second, fourth, sixth and eighth parallelogram flexures 340, 354, 362, 374 each of the first, third, fifth and seventh parallelogram flexures 334, 348, 356, 368 can be at other angles relative to each of the second, fourth, sixth and eighth are flexures 340, 354, 362, 374.

Figure 10:
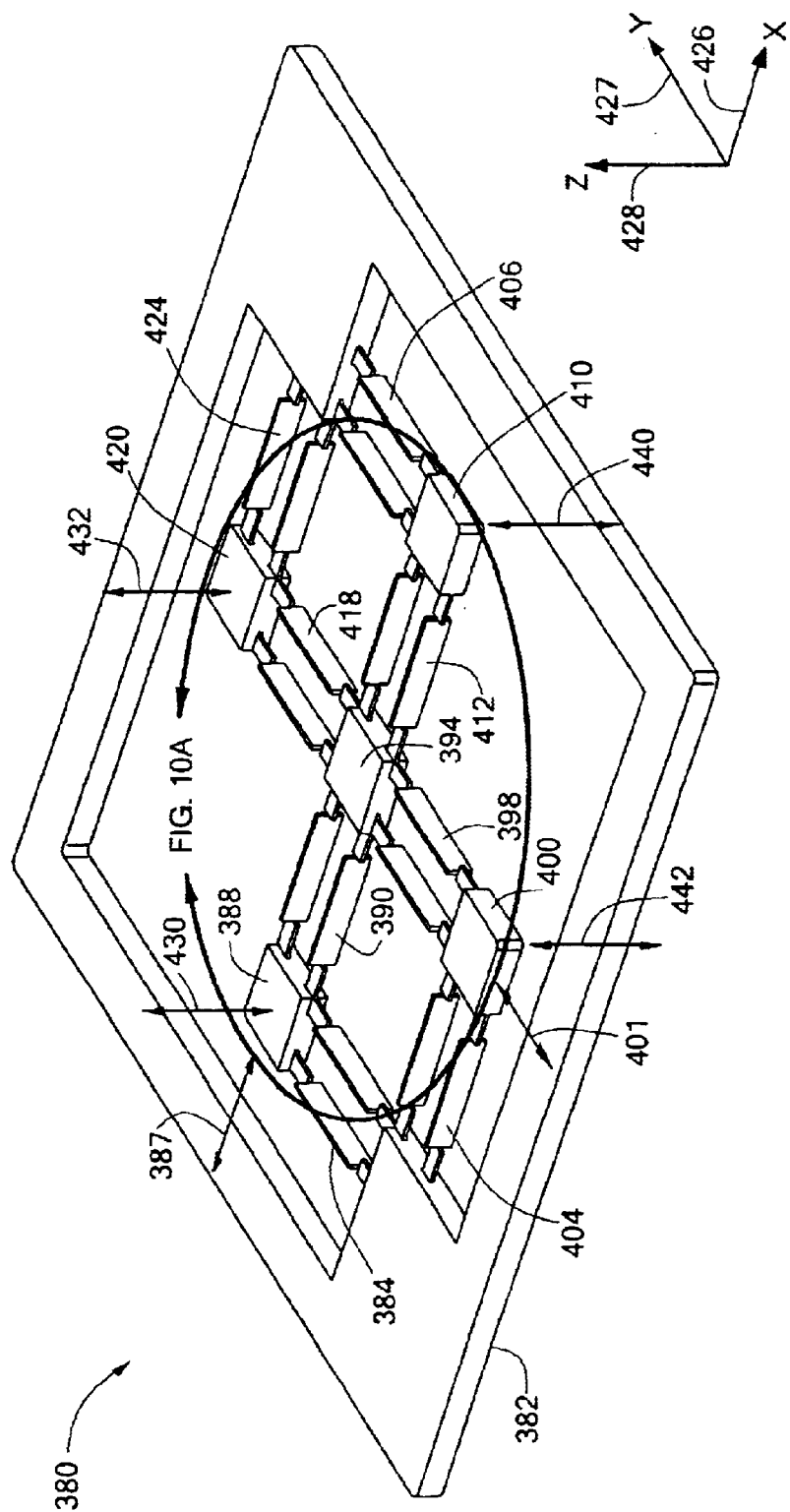
FIG. 10 is an isometric view of yet another alternate motion apparatus having eight parallelogram flexures each having an alternate arm arrangement in accordance with the present invention.
Figure 10A:
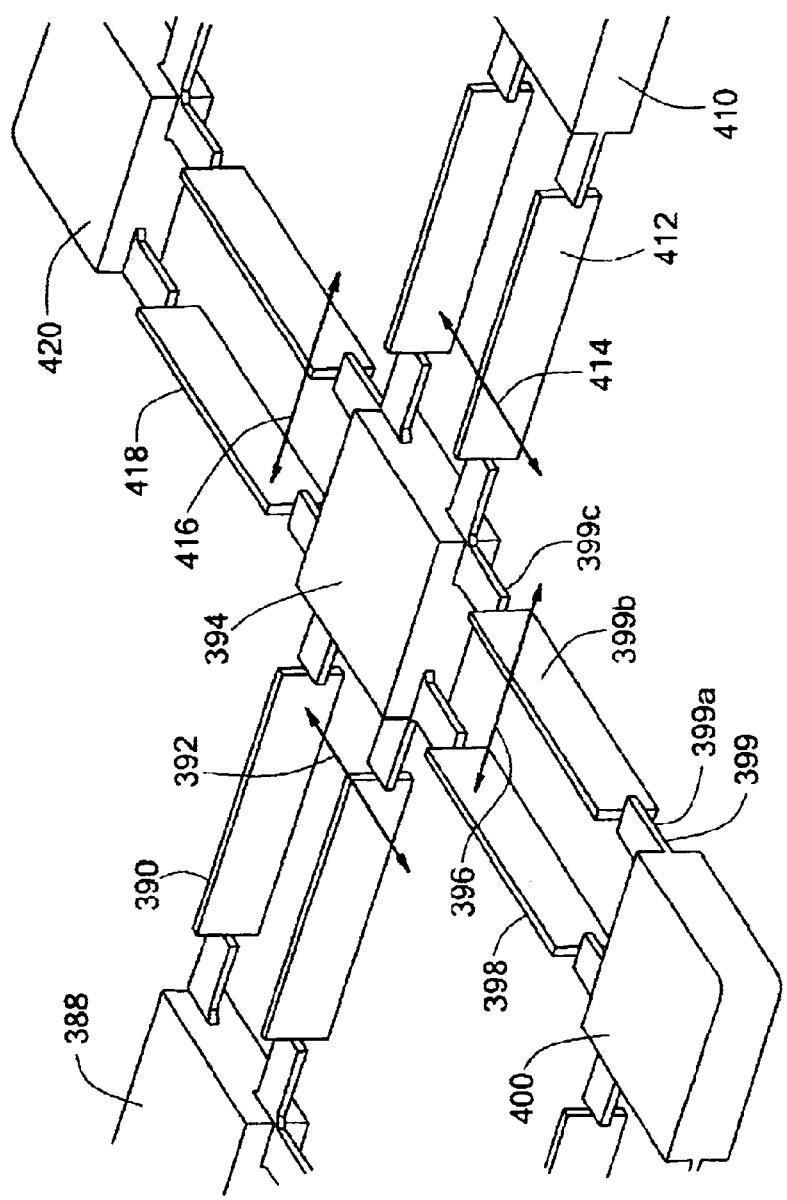
FIG. 10A is an isometric view of a portion of the motion apparatus of FIG. 10.

Referring now to FIGS. 10 and 10A, in which like elements are shown having like reference designations, yet another alternate motion apparatus 380 includes a base 382, a first parallelogram flexure 384, a first intermediate stage 388, a second parallelogram flexure 390, a motion stage 394, a third parallelogram flexure 398, a second intermediate stage 400, a fourth parallelogram flexure 404, a fifth parallelogram flexure 406, a third intermediate stage 410, a sixth parallelogram flexure 412, a seventh parallelogram flexure 418, a fourth intermediate stage 420, and a eighth parallelogram flexure 424. The parallelogram flexures 384, 390, 398, 404, 406, 412, 418, 424 can be similar to the parallelogram flexure 70 described in association with FIG. 2.

The first parallelogram flexure 384, the first intermediate stage 388, the second parallelogram flexure 390, the motion stage 394, the third parallelogram flexure 398, the second intermediate stage 400, the fourth parallelogram flexure 404, the fifth parallelogram flexure 406, the third intermediate stage 410, the sixth parallelogram flexure 412, the seventh parallelogram flexure 418, the fourth intermediate stage 420, and the eighth parallelogram flexure 424 lie substantially in a plane, the plane defined by an x-axis 426 and a y-axis 427.

The first parallelogram flexure 384 and the fifth parallelogram flexure 406 have respective primary compliances (not shown) in the direction of the x-axis 426. The second parallelogram flexure 390 and the fourth parallelogram flexure 412 have respective primary compliances 392, 414 in the direction of the y-axis 427. The third parallelogram flexure 398 and the seventh parallelogram flexure 418 have respective primary compliances 396, 416 in the direction of the x-axis 426. The fourth parallelogram flexure 404 and the eighth parallelogram flexure 424 have respective primary compliances (not shown) in the direction of the y-axis 427.

Here, each of the arms of the parallelogram flexures 384, 390, 398, 404, 406, 412, 418, 424 is comprised of a combination of two horizontal and one vertical blade. Taking arm 399 as representative of all such arms, the vertical blade 399b is surrounded by two horizontal blades 399a, 399c. The vertical blade 399b has a minimum cross sectional dimensions in the direction of the x-axis 426, and each of the horizontal blades 399a, 399c have respective minimum cross sectional dimensions in the direction of the z-axis 428. Because of the horizontal blades, for example, the horizontal blades 399a, 399c, each of the first through the eighth parallelogram flexures 324, 342, 348, 354, 356, 362, 368, 374 have a secondary compliance (not shown) in the direction of the z-axis 428.

In operation, the motion stage 394 moves with a first primary degree of freedom in response to a first force 387 applied to the first intermediate stage 388 in the direction of the x-axis 426. The first primary degree of freedom is substantially in the direction of the first force 387, along the x-axis 426. The motion stage 394 also moves with a second primary degree of freedom in response to a second force 401 applied to the second intermediate stage 400 in the direction of the y-axis 427. The second primary degree of freedom is substantially along the y-axis 427. Thus, the motion stage 394 moves with substantially two degrees of freedom in response to forces 392, 401. A complimentary first force (not shown) applied to the third intermediate stage 410 in the direction of the x-axis 426 generates the same motion of the motion stage as the first force 392. A complimentary second force (not shown) applied to the fourth intermediate stage 420 in the direction of the y-axis 427 generates the same motion of the motion stage as the second force 401.

With this particular arrangement, because of the secondary compliance provided by the horizontal blades, for example, the horizontal blades 399a, 399c, the motion stage 394 also moves in one or more of rotation about the x-axis 426, rotation about the y-axis 427, and translation along the z-axis 428 in response to one or more of a third force 430 applied to the first intermediate stage 388 in the direction of the z-axis 428, a fourth force 432 applied to the fourth intermediate stage 420 in the direction of the z-axis 428, a fifth force 440 applied to the third intermediate stage 410 in the direction of the z-axis 428, and a sixth force 442 applied to the second intermediate stage 400 in the direction of the z-axis 428. Thus, the motion apparatus 380 can provide the motion stage 394 having five degrees of freedom, and one constrained degree of freedom in rotation about the z-axis 428.

Direct, parasitic, and coupled error motions, each described above, can be associated with the motions of the motion stage 394 in response to the first force 387, the second force 401, the first complimentary force (not shown), the second complimentary force (not shown), the fifth force 430, the sixth force 432, the seventh force 440, and the eighth force 442. For example, the motion stage 394 can have direct error motion, wherein the motion stage 394 rotates in response to a rotational force 393 about a z-axis 428. For another example, the motion stage 394 can have parasitic error motion, wherein the motion stage 394 rotates about the z-axis 428 in response to either the first or the second forces 387,432. For yet another example, the motion stage can have coupled error motion, wherein the motion stage moves along the x-axis 426 in response to the second force 401. Similarly, the motion stage 394 can move along the y-axis 427 in response to the first force 392.

While each of the first, third, firth and seventh parallelogram flexures 384, 398, 406, 418 are shown to be orthogonal to each of the second, fourth, sixth and eighth parallelogram flexures 390, 404, 412, 424 each of the first, third, firth and seventh parallelogram flexures 384, 398, 406, 418 can be at other angles relative to each of the second, fourth, sixth and eighth are flexures 390, 404, 412, 424.

While one vertical blade, for example the vertical blade 399b, is shown surrounded by two horizontal blades, for example the horizontal blades 399a, 399c, it will be appreciated that, in another embodiment, each arm, for example the arm 399, can be comprised of any number of vertical and horizontal blades.

While the parallelogram flexures 384, 390, 398,404, 406, 412, 418, and 424 are shown, it should be understood that, in another embodiment (not shown), arm flexures, such as the arm flexure of FIG. 1, but having an arm analogous to the arm 399 could be used in place of the parallelogram flexures 384, 390, 398, 404, 406, 412, 418, and 424. Though the error motions for the arm flexure embodiment would be greater than the error motions of the motion apparatus 380, such an embodiment can be used in a variety of applications.

Figure 11:
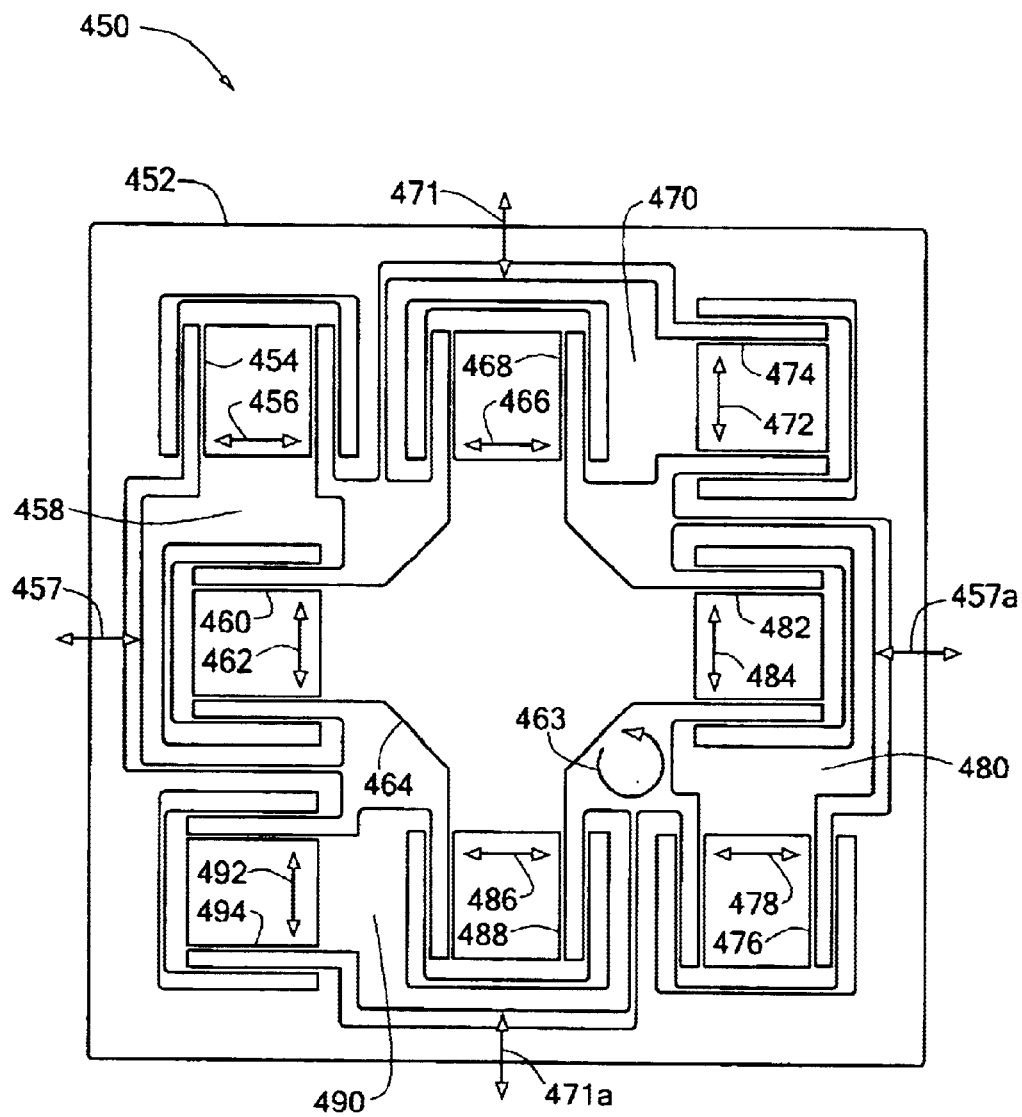
FIG. 11 is a plan view of yet another alternate motion apparatus having eight compound parallelogram flexures in accordance with the present invention.

Referring now to FIG. 11, yet another alternate motion apparatus 450 includes a base 452, a first compound parallelogram flexure 456, a first intermediate stage 458, a second compound parallelogram flexure 460, a motion stage 464, a third compound parallelogram flexure 468, a second intermediate stage 470, a fourth compound parallelogram flexure 474, a fifth compound parallelogram flexure 476, a third intermediate stage 480, a sixth compound parallelogram flexure 482, a seventh compound parallelogram flexure 488, a fourth intermediate stage 490, and an eighth compound parallelogram flexure 494. The first through the eighth compound parallelogram flexures 346, 460, 468, 474, 476, 482, 488, 494 can be the type of compound parallelogram flexure 100 described in association with FIG. 3.

The first compound parallelogram flexure 456, the first intermediate stage 458, the second compound parallelogram flexure 460, the motion stage 464, the third compound parallelogram flexure 468, the second intermediate stage 470, the fourth compound parallelogram flexure 474, the fifth compound parallelogram flexure 476, the third intermediate stage 480, the sixth compound parallelogram flexure 482, the seventh compound parallelogram flexure 488, the fourth intermediate stage 490, and the eighth compound parallelogram flexure 494 lie substantially in a plane, the plane defined by an x-axis 496 and a y-axis 497.

The first compound parallelogram flexure 346 and the fifth compound parallelogram flexure 476 have respective primary compliances 456, 478 in the direction of the x-axis 496. The second compound parallelogram flexure 460 and the fourth compound parallelogram flexure 482 have respective primary compliances 462, 484 in the direction of the y-axis 497. The third compound parallelogram flexure 468 and the seventh compound parallelogram flexure 488 have respective primary compliances 466, 486 in the direction of the x-axis 496. The fourth compound parallelogram flexure 474 and the eighth compound parallelogram flexure 494 have respective primary compliances 472, 492 in the direction of the y-axis 497.

In operation, the motion stage 464 moves with a first primary degree of freedom in response to a first force 457 applied to the first intermediate stage 458 in the direction of the x-axis 496. The first primary degree of freedom is substantially in the direction of the first force 457, along the x-axis 496. The motion stage 464 also moves with a second primary degree of freedom in response to a second force 471 applied to the second intermediate stage 470 in the direction of the y-axis 497. The second primary degree of freedom is substantially along the y-axis 497. Thus, the motion stage 464 moves with substantially two degrees of freedom in response to the forces 457, 471. A complimentary first force 457*a* applied the third intermediate stage 480 in the direction of the x-axis 496 generates the same motion of the motion stage as the first force 457. A complimentary second force 471*a* applied to the fourth intermediate stage 490 in the direction of the y-axis 497 generates the same motion of the motion stage as the second force 471.

Direct, parasitic, and coupled error motions, each described above, can be associated with the motions of the motion stage 464. For example, the motion stage 464 can have direct error motion, wherein the motion stage 464 rotates in response to a rotational force 463 about a z-axis 498. For another example, the motion stage 464 can have parasitic error motion, wherein the motion stage 464 rotates about the z-axis 498 in response to either the first or the second forces 457, 471. For yet another example, the motion stage can have coupled error motion, wherein the motion stage moves along the x-axis 496 in response to the second force 471. Similarly, the motion stage 464 can move along the y-axis 497 in response to the first force 457. However, due to properties of the compound parallelogram flexure 100 described in conjunction with FIG. 3, the error motions of the motion apparatus 450 are substantially zero.

As described above, the motion apparatus 450 is best realized if actuators that generate the first force 457 and the second force 471 are stationary relative to the base 452. Ideally, the actuators are mutually independent, unaffected by the other of the actuators. Thus, as the first force 457 is applied to the first intermediate stage 458, it is desirable that the second intermediate stage 470 not move, particularly in the direction of the x-axis 496. Similarly, as the second force 471 is applied to the second intermediate stage 470, it is desirable that the first intermediate stage 346 not move, particularly in the direction of the y-axis 497. Here, due to the small direct, parasitic, and coupled error motions, the third rigid bodies 460*a*, 468*a*, 482*a*, 488*a* and thus the actuators (not shown) that apply force to the third rigid bodies 460*a*, 468*a*, 482*a*, 488*a*, are substantially independent.

Also as described above, it is desirable that the first intermediate stage 458 move primarily in the direction of the x-axis 496, and not move in the direction of the y-axis 497, in response to the first force 457. Similarly, it is desirable that the second intermediate stage 470 move primarily in the direction of the y-axis 497, and not move in the direction of the x-axis 496, in response to the second force 471. Here, the first intermediate stage 458 and the third intermediate stage 480 move primarily in the direction of the x-axis 496 in response to the first force 457, with substantially no movement in the direction of the y-axis 497. Similarly, the second intermediate stage 470 and the fourth intermediate stages 490 move primarily in the direction of the y-axis 497 in response to the second force 471, with substantially no movement in the direction of the x-axis 496.

As described above, if the compound parallelogram flexures 454, 460, 468, 474, 476, 482, 488, 494 had only one degree of freedom, the one degree of freedom being translation along the respective primary compliance 456, 462, 466, 472, 478, 484, 486, 492, then the error motions described above would be reduced. As described above, the compound parallelogram flexure (100, FIG. 3) has very small error motions. Thus, the motion stage 464 exhibits substantially zero error motion in response to the first and second forces 457, 471. Due to the geometric symmetry afforded by the fifth, sixth, seventh, and eighth compound parallelogram flexures 476, 482, 488, 494, the error motions of the motion stage 464 are reduced even more than those of the motion stage 244 of FIG. 7. Since the compound parallelogram flexure 100 (FIG. 3) has less error motion than the arm flexure 50 (FIG. 1) and the parallelogram flexure 70 (FIG. 2), the motion stage 464 of the motion apparatus 450 has less error motion than the motion stage 294 (FIG. 8) and the motion stage 344 (FIG. 9). As described above, the motion apparatus 450 generates substantially zero error motions.

While each of the first, third, fifth and seventh compound parallelogram flexures 454, 468, 476, 488 are shown to be orthogonal to each of the second, fourth, sixth and eighth compound parallelogram flexures 460, 474, 482, 494 each of the first, third, fifth and seventh compound parallelogram flexures 454, 468, 476, 488 can be at other angles relative to each of the second, fourth, sixth and eighth are flexures 460, 474, 482, 494.

Figure 12:
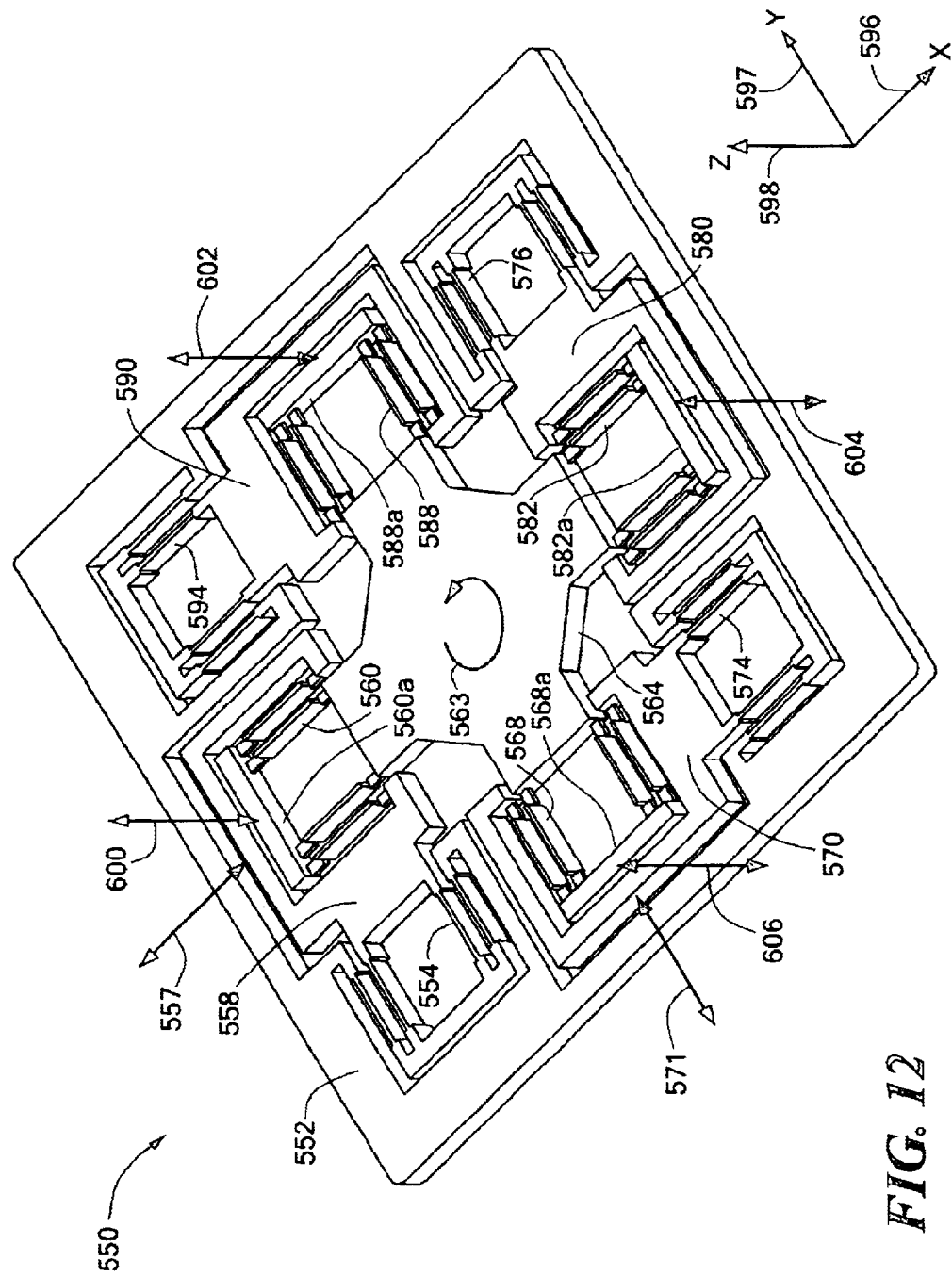
FIG. 12 is an isometric view of yet another alternate motion apparatus having eight compound parallelogram flexures each having an alternate arm arrangement in accordance with the present invention.
Figure 12A:
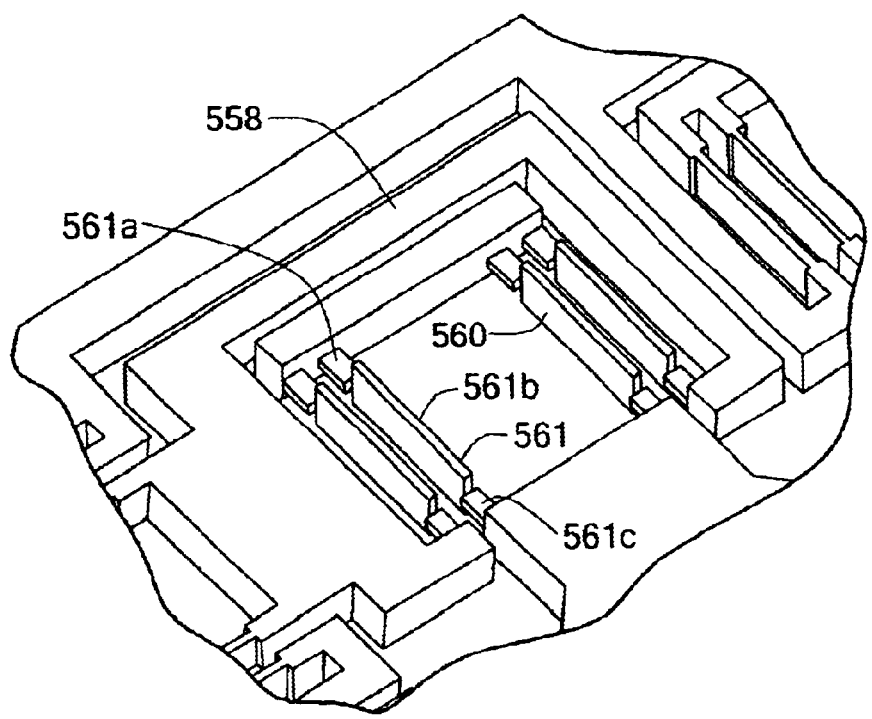
FIG. 12A is an isometric view of a portion of the motion apparatus of FIG. 12.

Referring now to FIGS. 12 and 12A, in which like elements are shown having like reference designations, yet another alternate motion apparatus 550 includes a base 552, a first compound parallelogram flexure 554, a first intermediate stage 558, a second compound parallelogram flexure 560, a motion stage 564, a third compound parallelogram flexure 568, a second intermediate stage 570, a fourth compound parallelogram flexure 574, a fifth compound parallelogram flexure 576, a third intermediate stage 580, a sixth compound parallelogram flexure 582, a seventh compound parallelogram flexure 588, a fourth intermediate stage 590, and an eighth compound parallelogram flexure 594. The compound parallelogram flexures 554, 560, 568, 574, 576, 582, 588, 594 can be similar to the compound parallelogram flexure 100 described in association with FIG. 3.

The first compound parallelogram flexure 554, the first intermediate stage 558, the second compound parallelogram flexure 560, the motion stage 564, the third compound parallelogram flexure 568, the second intermediate stage 570, the fourth compound parallelogram flexure 574, the fifth compound parallelogram flexure 576, the third intermediate stage 580, the sixth compound parallelogram flexure 582, the seventh compound parallelogram flexure 588, the fourth intermediate stage 590, and the eighth compound parallelogram flexure 594 lie substantially in a plane, the plane defined by an x-axis 596 and a y-axis 597.

The first compound parallelogram flexure 554 and the fifth compound parallelogram flexure 576 have respective primary compliances (not shown) in the direction of the x-axis 596. The second compound parallelogram flexure 560 and the fourth compound parallelogram flexure 582 have respective primary compliances (not shown) in the direction of the y-axis 597. The third compound parallelogram flexure 568 and the seventh compound parallelogram flexure 588 have respective primary compliances (not shown) in the direction of the x-axis 596. The fourth compound parallelogram flexure 574 and the eighth compound parallelogram flexure 594 have respective primary compliances (not shown) in the direction of the y-axis 597.

Here, each of the arms of four of the compound parallelogram flexures 560, 568, 582, 588 is comprised of a combination of two horizontal and one vertical blade. Taking arm 561 as representative of all such arms, the vertical blade 561b is surrounded by two horizontal blades 561a, 561c. The vertical blade 561b has a minimum cross sectional dimension in the direction of the x-axis 596, and each of the horizontal blades 561a, 561c have a respective minimum cross sectional dimension in the direction of the z-axis 598. Because of the horizontal blades, for example, the horizontal blades 561a, 561c, each of the first through the eighth compound parallelogram flexures 554, 560, 568, 574, 576, 582, 588, 594 have a secondary compliance (not shown) in the direction of the z-axis 598.

In operation, the motion stage 564 moves-with a first primary degree of freedom in response to a first force 557 applied to the first intermediate stage 558 in the direction of the x-axis 596. The first primary degree of freedom is substantially in the direction of the first force 557, along the x-axis 596. The motion stage 564 also moves with a second primary degree of freedom in response to a second force 571 applied to the second intermediate stage 570 in the direction of the y-axis 597. The second primary degree of freedom is substantially along the y-axis 597. Thus, the motion stage 564 moves with substantially two degrees of freedom in response to forces 557, 571. A complimentary first force (not shown) applied to the third intermediate stage 580 in the direction of the x-axis 596 generates the same motion of the motion stage as the first force 562. A complimentary second force (not shown) applied to the fourth intermediate stage 590 in the direction of the y-axis 597 generates the same motion of the motion stage as the second force 571.

With this particular arrangement, because of the secondary compliance provided by the horizontal blades, for example, the horizontal blades 561a, 561c, the motion stage 564 also moves in one or more of rotation about the x-axis 596, rotation about the y-axis 597, and translation along the z-axis 598 in response to one or more of a third force 600 applied to the a third rigid body 560a of the second compound parallelogram flexure 560 in the direction of the z-axis 598, a fourth force 602 applied to the a third rigid body 588a of the seventh compound parallelogram flexure 588 in the direction of the z-axis 598, a fifth force 604 applied to the a third rigid body 582a of the sixth compound parallelogram flexure 582 in the direction of the z-axis 598, and a sixth force 606 applied to the a third rigid body 568a of the third compound parallelogram flexure 568 in the direction of the z-axis 598. Thus, the motion apparatus 550 can provide the motion stage 564 having five degrees of freedom, and one constrained degree of freedom in rotation about the z-axis 598.

Direct, parasitic, and coupled error motions, each described above, can be associated with the motions of the motion stage 564 in response to the first force 557, second force 571, first complimentary (not shown), second complimentary (not shown), and firth through eighth forces 600–606. For example, the motion stage 564 can have direct error motion, wherein the motion stage 564 rotates in response to a rotational force 563 about a-z-axis 598. For another example, the motion stage 564 can have parasitic error motion, wherein the motion stage 564 rotates about the a z-axis 598 in response to either the first or the second forces 557, 571 described above. For yet another example, the motion stage can have coupled error motion, wherein the motion stage moves along the x-axis 596 in response to the second force 571. Similarly, the motion stage 564 can move along the y-axis 597 in response to the first force 562. However, due to the properties of the compound parallelogram flexure 100 described in conjunction with FIG. 3, the error motions of the motion apparatus 550 are substantially zero.

While each of the first, third, firth and seventh compound parallelogram flexures 554, 568, 576, 588 are shown to be orthogonal to each of the second, fourth, sixth and eighth compound parallelogram flexures 560, 574, 582, 594 each of the first, third, firth and seventh compound parallelogram flexures 554, 568, 576, 588 can be at other angles relative to each of the second, fourth, sixth and eighth are flexures 560, 574, 582, 594.

While one vertical blade, for example the vertical blade 561b, is shown surrounded by two horizontal blades, for example the horizontal blades 561a, 561c, it will be appreciated that, in another embodiment, each arm, for example the arm 561, can be comprised of any number of vertical and horizontal blades.

Figure 13:
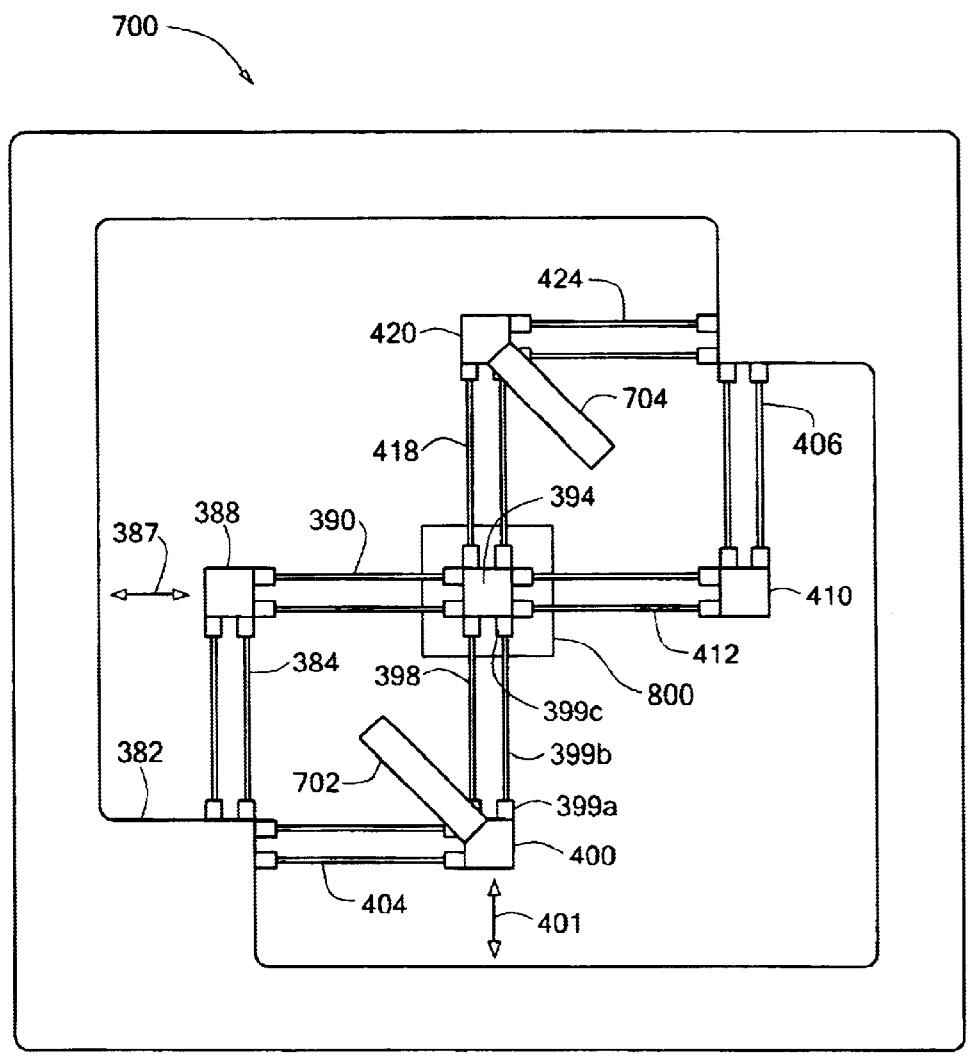
FIG. 13 is a plan view of the motion apparatus of FIG. 10, showing an alternate arrangement.
Figure 13:
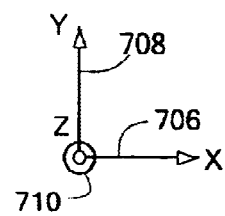

Referring now to FIG. 13, in which like elements of FIG. 10 are shown having like reference designations, the motion apparatus 700, in comparison with the motion apparatus 380 of FIG. 10, further includes a first rigid member 702 having a first end coupled to the second intermediate stage 400 and a second rigid member 704 having a first end coupled to the fourth intermediate stage 420.

A first member force (not shown) can be applied to the second end of the first rigid member 702, the first member force in the direction of a z-axis 710. A second member force (not shown) can be applied to the second end of the second rigid member 704, the second member force also in the direction of the z-axis 710.

With this particular arrangement, because of the secondary compliance provided by the horizontal blades, for example, the horizontal blades 399a, 399c, the motion stage 394 can move in one or more of rotation about an x-axis 706, rotation about the y-axis 708, and translation along a z-axis 710 in response to one or more of the first member force and the second member force. Here, the first member force applied alone or the second member force applied alone to the first rigid member 702 or the second rigid member 704 respectively, generates a motion of the motion stage 394 that both translates along the z-axis 710 and rotates in only one degree of freedom, here about the y-axis 708. Here, where the first member force and the second member force are equal an opposite, the motion stage 394 rotates about the y-axis 708, without translation in the z-axis 710. Thus, the motion apparatus 700 can provide the motion stage 394 up to five degrees of freedom, and one constrained degree of freedom in rotation about the z-axis 428.

The advantage of the motion apparatus 700 over the motion apparatus 380 (FIG. 10) is that it allows for a pure rotation of the motion stage 394 about the y-axis 708 when first member force and second member force are applied to the first rigid member 702 and the second rigid member 704 respectively. In the motion apparatus 380 (FIG. 10), application of force 430 and force 440 on intermediate stages 388 and 410 respectively produces a rotation of the motion stage 394 about an axis 45 degrees from the y-axis 427, and not the y-axis itself.

While the first and the second rigid members 702, 704 are shown coupled to the second and the fourth intermediate stages 400, 420, it will be understood that, in another embodiment, the first and the second rigid members 702, 704 can similarly be coupled instead to the first and the third intermediate stages 388, 410. In the alternate embodiment, where the first member force and the second member force are equal and opposite, the motion stage 394 rotates about the x-axis 706, without translation in the z-axis 710. In other embodiments, there can be from one to four rigid members, each coupled respectively to the first intermediate stage 388, second intermediate stage 400, third intermediate stage 410, and fourth intermediate stage 420.

While the parallelogram flexures 384, 390, 398, 404, 406, 412, 418, 424 are shown, it should be appreciated that, in other embodiments, rigid members such as the rigid members 702, 704 can similarly be coupled to a motion apparatus having arm flexures (i.e. FIG. 8) or a motion apparatus having compound parallelogram flexures (e.g., FIG. 12). When coupled to an alternate arrangement having compound parallelogram flexures, the first end of the first rigid member is coupled to a third rigid body (e.g., 560a, FIG. 12) of a second compound parallelogram (e.g., 560, FIG. 12) and the first end of the second rigid member is coupled to the third rigid body (e.g., 582a, FIG. 12) of the sixth compound parallelogram (e.g., 582, FIG. 12). Similarly, the first ends of a third rigid member (not shown) and a fourth rigid member (not shown) can be coupled respectively to the third rigid bodies (e.g. 568a, 588a, FIG. 12) of the third and seventh compound parallelograms (e.g. 568, 588, FIG. 12).

For each of the embodiments described in association with FIGS. 5–13, it will be understood that a platform can be coupled to the respective motion stages 144, 194, 244, 294, 344, 394, 464, 564, in order to increase the effective area of the respective motion stages (e.g. platform 800 FIG. 13). While the platform 800, is shown to be under the motion stage 394, one of ordinary skill in the art will understand that the platform 800 can be coupled equally well to the top of the motion stage 394.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A motion apparatus, comprising
   a base;
   a first flexure coupled to the base and having a first flexure primary compliance along a first coordinate axis;
   a first intermediate stage coupled to the first flexure, wherein the first flexure is coupled between the base and the first intermediate stage;
   a second flexure coupled to the first intermediate stage and having a second flexure primary compliance along a second coordinate axis;
   a motion stage coupled to the second flexure, wherein the second flexure is coupled between the first intermediate stage and the motion stage;
   a third flexure coupled to the motion stage and having a third flexure primary compliance along the first coordinate axis;
   a second intermediate stage coupled to the third flexure, wherein the third flexure is between the motion stage and the second intermediate stage; and
   a fourth flexure coupled between the second intermediate stage and the base and having a fourth flexure primary compliance along the second coordinate axis, wherein the first flexure, the first intermediate stage, the second flexure, the motion stage, the third flexure, the second intermediate stage and the fourth flexure lie substantially in a plane, the plane defined by the first and the second coordinate axes, a third coordinate axis perpendicular to the first and the second coordinate axes, and wherein the motion stage moves substantially along the first coordinate axis in response to a force applied in a direction along the first coordinate axis, and the motion stage moves substantially along the second coordinate axis in response to a force applied in a direction along the second coordinate axis.

2. The motion apparatus of claim 1, wherein the first coordinate axis is orthogonal to the second coordinate axis.

3. The motion stage of claim 1, wherein the motion stage moves substantially along the first coordinate axis in response to a force applied to the first intermediate stage in a direction along the first coordinate axis, and the motion stage moves substantially along the second coordinate axis in response to a force applied to the second intermediate stage in a direction along the second coordinate axis.

4. The motion apparatus of claim 1, wherein at least one of the first, second, third and fourth flexures is an arm flexure.

5. The motion apparatus of claim 4, wherein the arm flexure comprises:
   a first rigid body;
   a second rigid body; and
   an arm having a first length coupled to the first and to the second rigid bodies, wherein the arm is adapted to bend, and wherein the first rigid body of the first flexure corresponds to the base, the second rigid body of the first flexure corresponds to the first intermediate stage, the first rigid body of the second flexure corresponds to the first intermediate stage, the second rigid body of the second flexure corresponds to the motion stage, the first rigid body of third flexure corresponds to the second intermediate stage, the second rigid body of third flexure corresponds to the motion stage, the first rigid body of fourth flexure corresponds to the base, and the second rigid body of fourth flexure corresponds to the second intermediate stage.

6. The motion apparatus of claim 5, wherein the arm is comprised of at least one of
   a first member having a rectangular cross section with a minimum dimension in the direction of a first member axis; and
   a second member coupled to the first member, the second member having a rectangular cross section with a minimum dimension in the direction of a second member axis, the second member axis generally perpendicular to the first member axis.

7. The motion apparatus of claim 1, wherein at least one of the first, second, third and fourth flexures comprises a parallelogram flexure.

8. The motion apparatus of claim 7, wherein the parallelogram flexure comprises:

a first rigid body;

a second rigid body;

a first arm having a first length coupled to the first and the second rigid bodies; and a second arm having a second length generally equal to the first length coupled to the first and the second rigid bodies, the second arm generally parallel to the first arm, wherein the first rigid body of the first flexure corresponds to the base, the second rigid body of the first flexure corresponds to the first intermediate stage, the first rigid body of the second flexure corresponds to the first intermediate stage, the second rigid body of the second flexure corresponds to the motion stage, the first rigid body of third flexure corresponds to the second intermediate stage, the second rigid body of the third flexure corresponds to the motion stage, the first rigid body of fourth flexure corresponds to the base, and the second rigid body of fourth flexure corresponds to the second intermediate stage.

9. The motion apparatus of claim 8, wherein the first arm and the second arm are each comprised of at least one of:

a first member having a rectangular cross section with a minimum dimension in the direction of a first member axis; and a second member coupled to the first member, the second member having a rectangular cross section with a minimum dimension in the direction of a second member axis, the second member axis generally perpendicular to the first member axis.

10. The motion apparatus of claim 1, wherein at least one of the first, second, third and fourth flexures comprises a compound parallelogram flexure.

11. The motion apparatus of claim 10, wherein the compound parallelogram flexure comprises:

a first rigid body;

a second rigid body;

a third rigid body;

a first arm having a first length coupled to the first and the third rigid bodies;

a second arm having a second length generally equal to the first length coupled to the second and the third rigid bodies;

a third arm having a third length generally equal to the second length coupled to the second and the third rigid bodies; and a fourth arm having a fourth length generally equal to the third length coupled to the first and the third rigid bodies, the first, second, third, and fourth arms generally parallel, wherein the first rigid body of the first flexure corresponds to the base, the second rigid body of the first flexure corresponds to the first intermediate stage, the first rigid body of the second flexure corresponds to the first intermediate stage, the second rigid body of the second flexure corresponds to the motion stage, the first rigid body of the third flexure corresponds to the second intermediate stage, the second rigid body of the third flexure corresponds to the motion stage, the first rigid body of the fourth flexure corresponds to the base, and the second rigid body of the fourth flexure corresponds to the second intermediate stage.

12. The motion apparatus of claim 11, wherein the first, second, third and fourth arms are each comprised of at least one of:

a first member having a rectangular cross section with a minimum dimension in the direction of a first member axis; and a second member coupled to the first member, the second member having a rectangular cross section with a minimum dimension in the direction of a second member axis, the second member axis generally perpendicular to the first member axis.

13. The motion apparatus of claim 1, further including:

a fifth flexure coupled to the base and having a fifth flexure primary compliance along the first coordinate axis;

a third intermediate stage coupled to the fifth flexure, the fifth flexure between the base and the third intermediate stage;

a sixth flexure coupled to the third intermediate stage and to the motion stage and having a sixth flexure primary compliance along the second coordinate axis, the sixth flexure between the third intermediate stage and the motion stage;

a seventh flexure coupled to the motion stage and having a seventh flexure primary compliance along the first coordinate axis;

a fourth intermediate stage coupled to the seventh flexure, the seventh flexure between the motion stage and the fourth intermediate stage; and an eighth flexure coupled between the fourth intermediate stage and the base and having an eighth flexure primary compliance along the second coordinate axis, wherein the fifth flexure, the third intermediate stage, the sixth flexure, the seventh flexure, the fourth intermediate stage, and the eighth flexure lie substantially in the plane.

14. The motion apparatus of claim 13, wherein the first coordinate axis is orthogonal to the second coordinate axis.

15. The motion apparatus of claim 13, wherein the motion stage moves substantially along the first coordinate axis in response to a force applied to the first intermediate stage or to the third intermediate stage in a direction also along the first coordinate axis, and the motion stage moves substantially along the second coordinate axis in response to a force applied to the second intermediate stage or to the fourth intermediate stage also along the second coordinate axis.

16. The motion apparatus of claim 13, wherein at least one of the fifth, sixth, seventh, and eighth flexures is an arm flexure.

17. The motion apparatus of claim 16, wherein the arm flexure comprises:

a first rigid body;

a second rigid body; and an arm having a first length coupled to the first and to the second rigid bodies, wherein the arm is adapted to bend, and wherein the first rigid body of the fifth flexure corresponds to the base, the second rigid body of the fifth flexure corresponds to the third intermediate stage, the first rigid body of the sixth flexure corresponds to the third intermediate stage, the second rigid body of the sixth flexure corresponds to the motion stage, the first rigid body of seventh flexure corresponds to the fourth intermediate stage, the second rigid body of seventh flexure corresponds to the motion stage, the first rigid body of eighth flexure corresponds to the base, and the second rigid body of eighth flexure corresponds to the second intermediate stage.

18. The motion apparatus of claim 17, wherein the arm is comprised of at least one of:
a first member having a rectangular cross section with a minimum dimension in the direction of a first member axis; and
a second member coupled to the first member, the second member having a rectangular cross section with a minimum dimension in the direction of a second member axis, the second member axis generally perpendicular to the first member axis.

19. The motion apparatus of claim 18, wherein the motion stage moves with one or more degrees of freedom in response to one or more of a first force applied to the first intermediate stage, a second force applied the second intermediate stage, a third force applied the third intermediate stage, and a fourth force applied the fourth intermediate stage, wherein the first, second, third and fourth forces are substantially parallel to the third coordinate axis.

20. The motion apparatus of claim 19, wherein the one or more degrees of freedom include one or more of rotation about the first and the second coordinate axes and translation along the third coordinate axis.

21. The motion apparatus of claim 18, further including at least one of:
a first rigid member having a first end coupled to the first intermediate stage,
a second rigid member having a first end coupled to the second intermediate stage,
a third rigid member having a first end coupled to the third intermediate stage, and
a fourth rigid member having a first end coupled to the fourth intermediate stage, the second end of the first rigid member adapted to receive a first force substantially parallel to the third coordinate axis, the second end of the second rigid member adapted to receive a second force substantially parallel to the third coordinate axis, the second end of the third rigid member adapted to receive a third force substantially parallel to the third coordinate axis, and the second end of the fourth rigid member adapted to receive a fourth force substantially parallel to the third coordinate axis, wherein the motion stage moves with one or more degrees of freedom in response to at least one of the first force, the second force, the third force, and the fourth force.

22. The motion apparatus of claim 21, wherein the one or more degrees of freedom include one or more of rotation about the first and the second coordinate axes, and translation along the third coordinate axis, and wherein the one degree of freedom is translation along the third coordinate axis.

23. The motion apparatus of claim 13, wherein at least one of the fifth, sixth, seventh, and eighth flexures comprises a parallelogram flexure.

24. The motion apparatus of claim 23, wherein the parallelogram flexure comprises:
a first rigid body;
a second rigid body;
a first arm having a first length coupled to the first and to the second rigid bodies; and
a second arm having a second length generally equal to the first length coupled to the first and to the second rigid bodies, the second arm generally parallel to the first arm, wherein the first rigid body of the fifth flexure corresponds to the base, the second rigid body of the fifth flexure corresponds to the third intermediate stage, the first rigid body of the sixth flexure corresponds to the third intermediate stage, the second rigid body of the sixth flexure corresponds to the motion stage, the first rigid body of seventh flexure corresponds to the fourth intermediate stage, the second rigid body of the seventh flexure corresponds to the motion stage, the first rigid body of eighth flexure corresponds to the base, and the second rigid body of eighth flexure corresponds to the fourth intermediate stage.

25. The motion apparatus of claim 24, wherein the first arm and the second arm are each comprised of at least one of:
a first member having a rectangular cross section with a minimum dimension in the direction of a first member axis; and
a second member coupled to the first member, the second member having a rectangular cross section with a minimum dimension in the direction of a second member axis, the second member axis generally perpendicular to the first member axis.

26. The motion apparatus of claim 25, wherein the motion stage moves with one or more degrees of freedom in response to one or more of a first force applied to the first intermediate stage, a second force applied the second intermediate stage, a third force applied the third intermediate stage, and a fourth force applied the fourth intermediate stage, wherein the first, second, third and fourth forces are substantially parallel to the third coordinate axis.

27. The motion apparatus of claim 25, further including at least one of:
a first rigid member having a first end coupled to the first intermediate stage;
a second rigid member having a first end coupled to the second intermediate stage;
a third rigid member having a first end coupled to the third intermediate stage; and
a fourth rigid member having a first end coupled to the fourth intermediate stage, the second end of the first rigid member adapted to receive a first force substantially parallel to the third coordinate axis, the second end of the second rigid member adapted to receive a second force substantially parallel to the third coordinate axis, the second end of the third rigid member adapted to receive a third force substantially parallel to the third coordinate axis, and the second end of the fourth rigid member adapted to receive a fourth force substantially parallel to the third coordinate axis, wherein the motion stage moves with one or more degrees of freedom in response to at least one of the first force, the second force, the third force, and the fourth force.

28. The motion apparatus of claim 27, wherein the one or more degrees of freedom include one or more of rotation about the first and the second coordinate axes, and translation along the third coordinate axis, and wherein the one degree of freedom is translation along the third coordinate axis.

29. The motion apparatus of claim 13, wherein at least one of the fifth, sixth, seventh, and eighth flexures comprises a compound parallelogram flexure.

30. The motion apparatus of claim 29, wherein the compound parallelogram flexure comprises:
- a first rigid body;
- a second rigid body;
- a third rigid body;
- a first arm having a first length coupled to the first and the third rigid bodies;
- a second arm having a second length generally equal to the first length coupled to the second and the third rigid bodies;
- a third arm having a third length generally equal to the second length coupled to the second and the third rigid bodies; and
- a fourth arm having a fourth length generally equal to the third length coupled to the first and the third rigid bodies, the first, second, third, and fourth arms generally parallel, wherein the first rigid body of the fifth flexure corresponds to the base, the second rigid body of the fifth flexure corresponds to the third intermediate stage, the first rigid body of the sixth flexure corresponds to the third intermediate stage, the second rigid body of the sixth flexure corresponds to the motion stage, the first rigid body of the seventh flexure corresponds to the fourth intermediate stage, the second rigid body of the seventh flexure corresponds to the motion stage, the first rigid body of the eighth flexure corresponds to the base, and the second rigid body of the eighth flexure corresponds to the fourth intermediate stage.

31. The motion apparatus of claim 30, wherein the first, second, third and fourth arms are each comprised of at least one of:
- a first member having a rectangular cross section with a minimum dimension in the direction of a first member axis; and
- a second member coupled to the first member, the second member having a rectangular cross section with a minimum dimension in the direction of a second member axis, the second member axis generally perpendicular to the first member axis.

32. The motion apparatus of claim 31, wherein the motion stage moves with one or more degrees of freedom in response to one or more of a first force applied to the third rigid body of the second flexure, a second force applied to the third rigid body of the sixth flexure, a third force applied the third rigid body of the third flexure, and a fourth force applied to the third rigid body of the seventh flexure, wherein the first, second, third and fourth forces are substantially parallel to the third coordinate axis.

33. The motion apparatus of claim 32, wherein the one or more degrees of freedom include one or more of rotation about the first and the second coordinate axes and translation along the third coordinate axis.

34. The motion apparatus of claim 31, further including at least one of
- a first rigid member having a first end coupled to the third rigid body of the second flexure;
- a second rigid member having a first end coupled to the third rigid body of the sixth flexure,
- a third rigid member having a first end coupled to the third rigid body of the third flexure; and
- a fourth rigid member having a first end coupled to the third rigid body of the seventh flexure, the second end of the first rigid member adapted to receive a first force substantially parallel to the third coordinate axis, the second end of the second rigid member adapted to receive a second force substantially parallel to the third coordinate axis, the second end of the third rigid member adapted to receive a third force substantially parallel to the third coordinate axis, and the second end of the fourth rigid member adapted to receive a fourth force substantially parallel to the third coordinate axis, wherein the motion stage moves with one or more degrees of freedom in response to at least one of the first force, the second force, the third force, and the fourth force.

35. The motion apparatus of claim 34, wherein the one or more degrees of freedom include one or more of rotation about the first and the second coordinate axes, and translation along the third coordinate axis, and wherein the one degree of freedom is translation along the third coordinate axis.

36. The motion apparatus of claim 13, further including a rigid platform coupled to the motion stage to increase the effective area of the motion stage.

37. The motion apparatus of claim 1, further including a rigid platform coupled to the motion stage to increase the effective area of the motion stage.

* * * * *

UNITED STATES PATENT AND TRADEMARK OFFICE
CERTIFICATE OF CORRECTION

PATENT NO. : 6,688,183 B2
APPLICATION NO. : 10/228874
DATED : February 10, 2004
INVENTOR(S) : Shorya Awtar et al.

It is certified that error appears in the above-identified patent and that said Letters Patent is hereby corrected as shown below:

Column 3, line 23 delete "provide" and replace with --provides--.

Column 4, line 24 delete "amount" and replace with --amounts--.

Column 4, line 53 delete "FIG. 2 an" and replace with --FIG. 2, an--.

Column 5, line 19 delete "ε." and replace with --ε1.--.

Column 7, line 21 delete "primary compliance 16, 20, 28, 34," and replace with --primary compliances 16, 20, 28, 34,--.

Column 9, line 24 delete "y-axis 1587." and replace with --y-axis 158.--.

Column 9, line 35 delete "second force 137, 151" and replace with --second forces 137, 151--.

Column 9, lines 49-50 delete "second the fourth flexure 140, 154," and replace with --second and fourth arm flexures 140, 154,--.

Column 9, line 58 delete ", second third," and replace with --, second, third,--.

Column 11, line 3 delete "second force 187, 201" and replace with --second forces 187, 201--.

Column 11, lines 20-21 delete "second the fourth flexure 190, 204," and replace with --second and fourth flexures 190, 204,--.

Column 12, lines 42-43 delete "primary compliance 236, 242, 246, 252," and replace with --primary compliances 236, 242, 246, 252,--.

Column 12, line 46 delete "second force 237, 251" and replace with --second forces 237, 251--.

UNITED STATES PATENT AND TRADEMARK OFFICE
CERTIFICATE OF CORRECTION

PATENT NO. : 6,688,183 B2
APPLICATION NO. : 10/228874
DATED : February 10, 2004
INVENTOR(S) : Shorya Awtar et al.

It is certified that error appears in the above-identified patent and that said Letters Patent is hereby corrected as shown below:

Column 12, line 54 delete "the error motions smaller" and replace with --error motions smaller--.

Column 12, line 66 delete "second the" and replace with --second and--.

Column 14, line 25 delete "stages" and replace with --stage--.

Column 14, line 54 delete "324 each" and replace with --324, each--.

Column 14, line 56 delete "are" and replace with --arm--.

Column 16, line 18 delete "stages" and replace with --stage--.

Column 16, line 26 delete "then" and replace with --, then--.

Column 16, line 51 delete "each" and replace with --, each--.

Column 16, line 54 delete "are" and replace with --arm--.

Column 16, line 64 delete "a" and replace with --an--.

Column 18, line 18 delete "firth" and replace with --fifth--.

Column 18, line 21 delete "each of the first, third, firth" and replace with --, each of the first, third, fifth--.

Column 18, line 24 delete "are" and replace with --arm--.

Column 19, line 24 delete "applied the" and replace with --applied to the--.

Column 20, line 6 delete "stages" and replace with --stage--.

UNITED STATES PATENT AND TRADEMARK OFFICE
CERTIFICATE OF CORRECTION

PATENT NO.      : 6,688,183 B2
APPLICATION NO. : 10/228874
DATED           : February 10, 2004
INVENTOR(S)     : Shorya Awtar et al.

It is certified that error appears in the above-identified patent and that said Letters Patent is hereby corrected as shown below:

Column 20, line 34 delete "each" and replace with --, each--.

Column 20, line 37 delete "are" and replace with --arm--.

Column 21, line 50 delete "to the a third" and replace with --to a third--.

Column 21, line 52 delete "to the a third" and replace with --to a third--.

Column 21, line 55 delete "to the a third" and replace with --to a third--.

Column 21, line 57 delete "to the a third" and replace with --to a third--.

Column 21, line 67 delete "firth" and replace with --fifth--.

Column 22, lines 5-6 delete "the a z-axis 598" and replace with --the z-axis 598--.

Column 22, line 16 delete ", firth" and replace with --, fifth--.

Column 22, line 19 delete "each" and replace with --, each--.

Column 22, line 20 delete ", firth" and replace with --, fifth--.

Column 22, line 22 delete "are" and replace with --arm--.

Column 22, line 57 delete "an" and replace with --and--.

Column 23, line 40 delete "800, is" and replace with --800 is--.

Column 24, line 49 delete "of third" and replace with --of the third--.

Column 24, line 50 delete "of third" and replace with --of the third--.

UNITED STATES PATENT AND TRADEMARK OFFICE
CERTIFICATE OF CORRECTION

PATENT NO.       : 6,688,183 B2                                    Page 4 of 5
APPLICATION NO. : 10/228874
DATED            : February 10, 2004
INVENTOR(S)      : Shorya Awtar et al.

It is certified that error appears in the above-identified patent and that said Letters Patent is hereby corrected as shown below:

Column 24, line 52 delete "of fourth" and replace with --of the fourth--.

Column 24, line 53 delete "of fourth" and replace with --of the fourth--.

Column 24, line 56 delete "of" and replace with --of:--.

Column 25, line 17 delete "of third" and replace with --of the third--.

Column 25, line 20 delete "of fourth" and replace with --of the fourth--.

Column 25, line 21 delete "of fourth" and replace with --of the fourth--.

Column 26, line 66 delete "of seventh" and replace with --of the seventh--.

Column 27, line 1 delete "of seventh" and replace with --of the seventh--.

Column 27, line 2 delete "of eighth" and replace with --of the eighth--.

Column 27, line 3 delete "of eighth" and replace with --of the eighth--.

Column 27, line 18 delete "applied the" and replace with --applied to the--.

Column 27, line 19 delete "applied the" and replace with --applied to the--.

Column 27, line 20 delete "applied the" and replace with --applied to the--.

Column 28, line 8 delete "of seventh" and replace with --of the seventh--.

Column 28, line 11 delete "of eighth" and replace with --of the eighth--.

Column 28, line 12 delete "of eighth" and replace with --of the eighth--.

UNITED STATES PATENT AND TRADEMARK OFFICE
CERTIFICATE OF CORRECTION

PATENT NO. : 6,688,183 B2
APPLICATION NO. : 10/228874
DATED : February 10, 2004
INVENTOR(S) : Shorya Awtar et al.

It is certified that error appears in the above-identified patent and that said Letters Patent is hereby corrected as shown below:

Column 28, line 30 delete "applied the" and replace with --applied to the--.

Column 28, line 31 delete "applied the" and replace with --applied to the--.

Column 28, line 32 delete "applied the" and replace with --applied to the--.

Signed and Sealed this

Sixteenth Day of June, 2009

JOHN DOLL
*Acting Director of the United States Patent and Trademark Office*